United States Patent
Lee

(10) Patent No.: US 10,432,415 B2
(45) Date of Patent: Oct. 1, 2019

(54) METHOD AND APPARATUS FOR INTERFERENCE AWARE COMMUNICATIONS

(71) Applicant: NEWRACOM, INC., Irvine, CA (US)

(72) Inventor: Ilgu Lee, Daejeon (KR)

(73) Assignee: NEWRACOM, INC., Lake Forest, CA (US)

( * ) Notice: Subject to any disclaimer, the term of this patent is extended or adjusted under 35 U.S.C. 154(b) by 182 days.

(21) Appl. No.: 14/930,560

(22) Filed: Nov. 2, 2015

(65) Prior Publication Data

US 2016/0135142 A1 May 12, 2016

Related U.S. Application Data

(60) Provisional application No. 62/074,572, filed on Nov. 3, 2014, provisional application No. 62/077,068, filed on Nov. 7, 2014.

(30) Foreign Application Priority Data

Oct. 6, 2015 (KR) .................. 10-2015-0140512

(51) Int. Cl.
| | |
|---|---|
| *H04L 12/18* | (2006.01) |
| *H04L 1/16* | (2006.01) |
| *H04W 84/12* | (2009.01) |
| *H04W 72/02* | (2009.01) |

(Continued)

(52) U.S. Cl.
CPC ........ *H04L 12/1877* (2013.01); *H04L 1/1671* (2013.01); *H04W 28/0236* (2013.01); *H04W 72/02* (2013.01); *H04W 72/082* (2013.01); *H04W 84/12* (2013.01)

(58) Field of Classification Search
CPC ............. H04L 12/1877; H04L 1/1671; H04W 28/0236; H04W 28/048; H04W 52/0238; H04W 72/02; H04W 72/042; H04W 72/082; H04W 84/12
See application file for complete search history.

(56) References Cited

U.S. PATENT DOCUMENTS

| | | | | |
|---|---|---|---|---|
| 2009/0285116 | A1* | 11/2009 | Nanda | ............... H04W 72/02 370/252 |
| 2012/0314673 | A1* | 12/2012 | Noh | ............... H04W 72/042 370/329 |
| 2013/0114515 | A1* | 5/2013 | Koo | ............... H04J 11/0023 370/329 |

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.

(Continued)

*Primary Examiner* — Eric Myers
(74) *Attorney, Agent, or Firm* — Morgan, Lewis & Bockius LLP

(57) ABSTRACT

A method for interference aware communications of devices in a wireless local area network is provided. The device selects a transmission channel of a frame among a plurality of sub-channels, generates interference aware information based on an interference condition of the plurality of sub-channels, inserts the interference aware information into the frame, and transmits the frame in the selected transmission channel.

20 Claims, 35 Drawing Sheets

(51) Int. Cl.
*H04W 72/08* (2009.01)
*H04W 28/02* (2009.01)

(56) References Cited

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

\* cited by examiner

METHOD AND APPARATUS FOR INTERFERENCE AWARE COMMUNICATIONS

CROSS-REFERENCE TO RELATED APPLICATION

This application claims priority to and the benefit of US Patent Application Nos. 62/074,572 and 62/077,068 filed in the USPTO on Nov. 3, 2014 and Nov. 7, 2014, and Korean Patent Application No. 10-2015-0140512 filed in the Korean Intellectual Property Office on Oct. 6, 2015, the entire contents of which are incorporated herein by reference.

BACKGROUND (a) Field

The described technology relates generally to a method and an apparatus for interference aware communications, and more particularly, to a method and an apparatus for interference aware communications in a wireless local area network (WLAN).

(b) Description of the Related Art

A WLAN is being standardized by the IEEE (Institute of Electrical and Electronics Engineers) Part 11 under the name of "Wireless LAN Medium Access Control (MAC) and Physical Layer (PHY) Specifications."

After an original standard was published in 1999, new version standards are continuously published by amendments. The IEEE standard 802.11a (IEEE Std 802.11a-1999) supporting 2.4 GHz band was published in 1999, the IEEE standard 802.11b (IEEE Std 802.11b-1999) supporting 5 GHz band was published in 1999, and the IEEE standard 802.11g (IEEE Std 802.11g-2003) supporting 5 GHz band was published in 2003. These standards are called legacy. Subsequently, the IEEE standard 802.11n (IEEE Std 802.11n-2009) for enhancements for higher throughput (HT) was published in 2009, and the IEEE standard 802.11 ac (IEEE 802.11 ac-2013) for enhancements for very high throughput (VHT) was published in 2013. Recently, a high efficiency (HE) WLAN for enhancing the system throughput in high density scenarios is being developed by the IEEE 802.11ax task group.

Since a wireless local area network (WLAN) uses a non-licensed frequency bandwidth, various devices present in the WLAN cause interference with each other. To avoid collisions with other devices, the WLAN device may uses a CSMA/CA (carrier sense multiple access/collision avoidance) scheme. The WLAN device may transmit a RTS (request to send)/CTS (clear to send) frame to inform neighbor devices of a channel occupation duration. The neighbor devices may set a network allocation vector (NAV) based on a duration field of the RTS/CTS frame and defer a medium access for the NAV duration. However, in dense networks overlapped a plurality of basic service sets (BSSs), if the NAV is set by the frames transmitted by the neighbor BSSs, a resource reused in the neighbor BSSs is reduced. A system throughput may be reduced.

In addition, the interference condition of a sender and a receiver in the dense networks may be unsymmetrical. In particular, to increase transmission opportunity by dynamically adjusting a clear channel assessment (CCA) level using a dynamic sensitivity control (DSC), an unsymmetrical interference condition may occur frequently. However the sender and the receiver are not aware of interference of the other party under the unsymmetrical interference condition. The system throughput may be reduced due to a frame loss by the interference.

The above information disclosed in this Background section is only for enhancement of understanding of the background and therefore it may contain information that does not form the prior art that is already known in this country to a person of ordinary skill in the art.

SUMMARY

An embodiment of the present disclosure provides a method and an apparatus for interference aware communications.

According to an embodiment, a method for interference aware communications by a device in a wireless local area network is provided. The method includes selecting a transmission channel of a frame among a plurality of sub-channels, generating interference aware information based on an interference condition of the plurality of sub-channels, inserting the interference aware information into the frame, and transmitting the frame in the selected transmission channel.

The interference aware information includes at least one sub-channel for response frame transmission of the frame.

The method further includes receiving a response frame of the frame in the sub-channel included in the interference aware information.

The generating of the interference aware information includes selecting at least one sub-channel for response frame transmission among the plurality of sub-channels, based on the interference condition of the plurality of sub-channels, and generating the interference aware information including the selected at least one sub-channel.

The selecting of the at least one sub-channel includes selecting a different sub-channel from the transmission channel among the plurality of sub-channels, when an interference level of the transmission channel is higher than a reference.

The generating of the interference aware information includes generating the interference aware information including an indicator for dynamic channel access supporting, when an interference level of the transmission channel is higher than a reference.

The interference aware information further includes at least one sub-channel with interference below a reference among the plurality of sub-channels.

The interference aware information is included in an interference aware information field of the frame, and the interference aware information field includes at least one of a first field indicating at least one sub-channel, a second field indicating an interference aware mode, and a third field indicating a response frame transmission delay.

The interference aware information field is included in a signal field of the frame.

According to another embodiment, a method for interference aware communications by a device in a wireless local area network is provided. The method includes receiving a data frame including interference aware information, generating a NACK frame requesting data retransmission based on the interference aware information, upon failing in decoding of the data frame, and transmitting the NACK frame to a transmit device of the data frame, wherein the interference aware information includes at least one of information indicating a dynamic channel access supporting and idle sub-channel information of the transmit device.

The generating of the NACK frame includes selecting at least one sub-channel for data retransmission among a plurality of sub-channels, based on an interference condition of the plurality of sub-channels, and inserting the selected at least one sub-channel into the NACK frame.

The method further includes receiving the data frame retransmitted in the at least one sub-channel included in the NACK frame.

The NACK frame is transmitted to an idle sub-channel included in the interference aware information.

The NACK frame includes at least one of a first field indicating the NACK frame and a second field indicating a recommended sub-channel for data retransmission.

According to yet another embodiment, a method for interference aware communications by a device in a wireless local area network is provided. The method includes selecting frame transmission channels for each of the plurality of receive devices among a plurality of sub-channels, determining a response frame recommendation channel for each of the plurality of receive devices based on an interference condition of the plurality of sub channels, and inserting a corresponding response frame recommendation channel into a frame transmitted to each of the plurality of receive devices.

The determining of the response frame recommendation channel includes determining at least one of the idle sub-channels as a response frame recommendation channel of a first receive device, when an interference level of a first frame transmission channel selected for the first receive device is higher than a reference and the number of idle sub-channels is equal or more than the number of receive devices.

The determining of the response frame recommendation channel further includes determining at least one adjacent channel of the plurality of sub-channels as the response frame recommendation channel of the first receive device, when there is no idle sub-channel among the plurality of sub-channels.

The method further includes inserting information indicating a response frame transmission delay into a transmit frame transmitted to at least one of the plurality of receive devices, when the number of idle sub-channels among the plurality of sub-channels is smaller than the number of receive devices.

The information indicating the response frame transmission delay is included in a delay field of the transmit frame.

The method further includes setting a duration field of the corresponding transmit frame based on the delay fields of each transmit frame.

According to the present disclosure, the receiver may be aware of the interference of the sender under the unsymmetrical interference condition and transmit the response frame to the channel which may avoid the interference, thereby reducing the response frame loss. Further, according to the present disclosure, the data sender may be aware of the interference of the receiver through the NACK frame transmission under the unsymmetrical interference condition and transmit the data frame to the channel which may avoid the interference, thereby increasing the data frame transmission success rate. According to the present disclosure, it is possible to perform the interference aware communications in the dense networks and increase the resource efficiency, the aggregate throughput, the power efficiency, or the like.

DETAILED DESCRIPTION OF THE EMBODIMENTS

Figure 1:
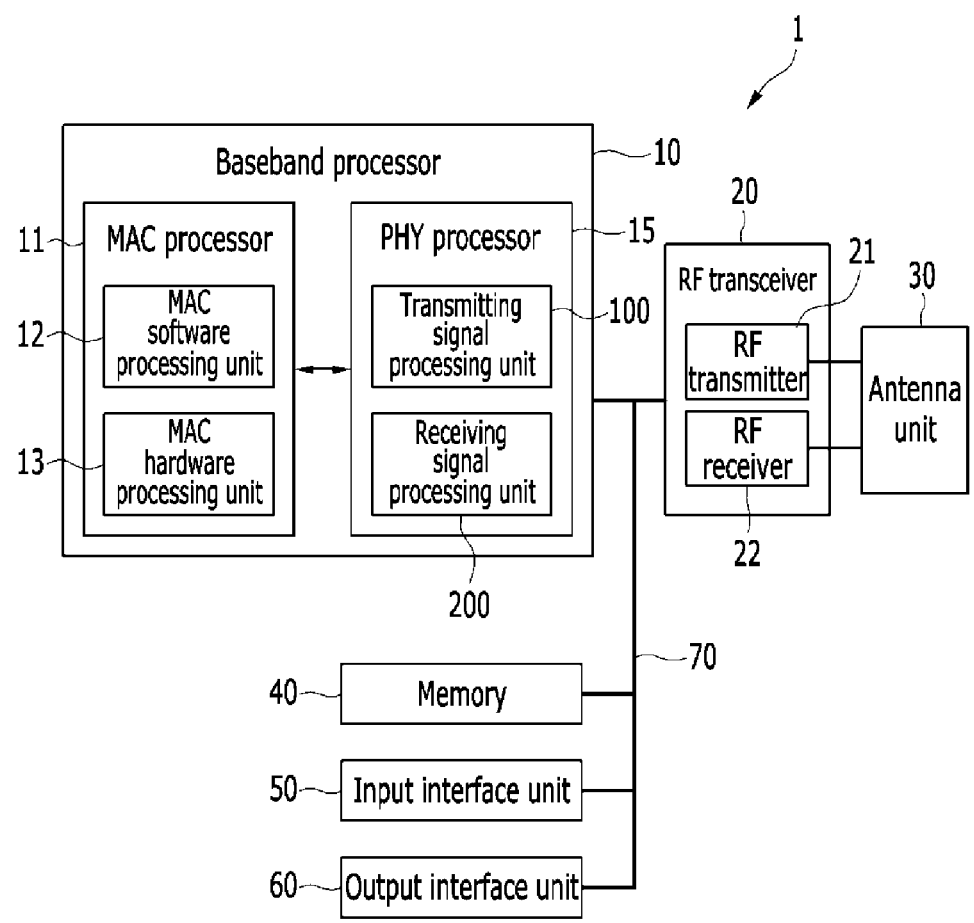
FIG. 1 is a schematic block diagram of a WLAN device according to an embodiment.

In the following detailed description, only certain embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to the IEEE (Institute of Electrical and Electronics Engineers) standard 802.11. The plurality of WLAN devices may include a WLAN device that is an access point and the other WLAN devices that are non-AP stations (non-AP STAs). Alternatively, all of the plurality of WLAN devices may be non-AP STAs in ad-hoc networking. In general, the AP STA and the non-AP STA may be collectively called the STAs. However, for ease of description, herein, only the non-AP STA are referred to as the STAs.

FIG. 1 is a schematic block diagram exemplifying a WLAN device according to an embodiment.

Referring to FIG. 1, the WLAN device 1 includes a baseband processor 10, a radio frequency (RF) transceiver 20, an antenna unit 30, a memory 40 including non-transitory computer-readable media, an input interface unit 50, an output interface unit 60, and a bus 70.

The baseband processor 10 performs baseband signal processing, and includes a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer, and the MAC hardware processing unit 13 may implement remaining functions of the MAC layer as hardware (hereinafter referred to "MAC hardware"). However, the MAC processor 11 is not limited to this.

The PHY processor 15 includes a transmitting (Tx) signal processing unit 100 and a receiving (Rx) signal processing unit 200.

The baseband processor 10, the memory 40, the input interface unit 50, and the output interface unit 60 may communicate with each other via the bus 70.

The RF transceiver 20 includes an RF transmitter 21 and an RF receiver 22.

The memory 40 may further store an operating system and applications. The input interface unit 50 receives information from a user, and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 2:
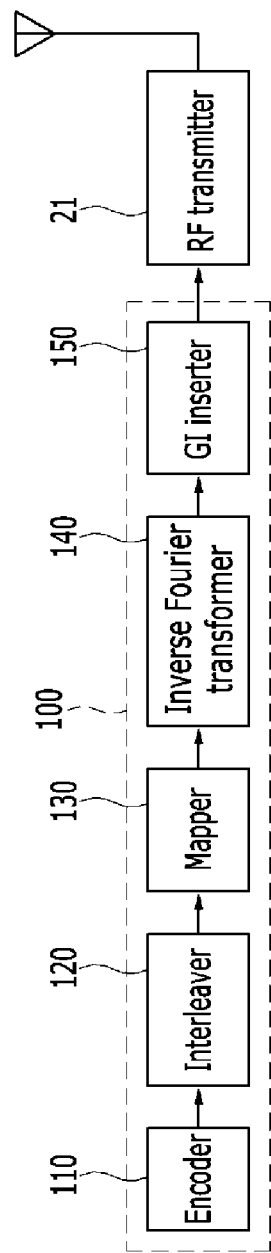
FIG. 2 is a schematic block diagram of a transmitting signal processor in an embodiment suitable for use in a WLAN.

FIG. 2 is a schematic block diagram of a transmitting signal processor 100 in an embodiment suitable for use in a WLAN.

Referring to FIG. 2, a transmitting signal processing unit 100 includes an encoder 110, an interleaver 120, a mapper 130, an inverse Fourier transformer (IFT) 140, and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change an order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers 130 corresponding to a number of spatial streams $N_{SS}$. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper.

When the MU-MIMO is used, some blocks before the spatial mapper may be provided for each user.

The GI inserter 150 prepends a guard interval (GI) to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 3:
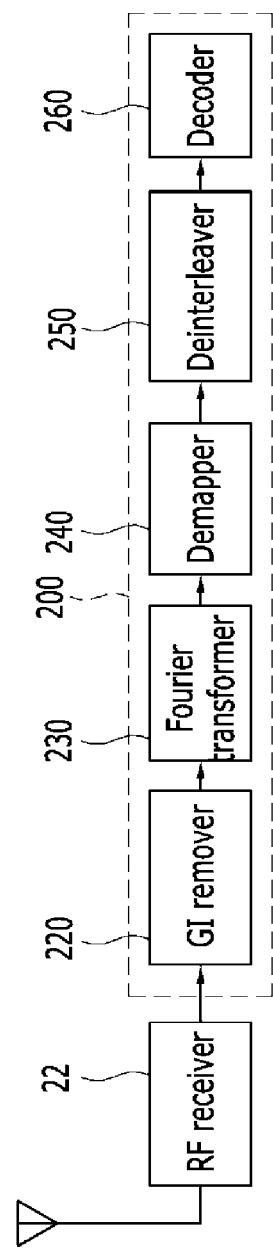
FIG. 3 is a schematic block diagram of a receiving signal processing unit in an embodiment suitable for use in the WLAN.

FIG. 3 is a schematic block diagram of a receiving signal processing unit according to an embodiment suitable for use in the WLAN.

Referring to FIG. 3, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into a symbol. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain.

When the MIMO or the MU-MIMO is used, the receiving signal processing unit 200 may include a spatial demapper for converting the Fourier transformed received symbols to constellation points of the space-time streams, and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder, the receiving signal processing unit 100 may not use the encoder deparser.

Figure 4:
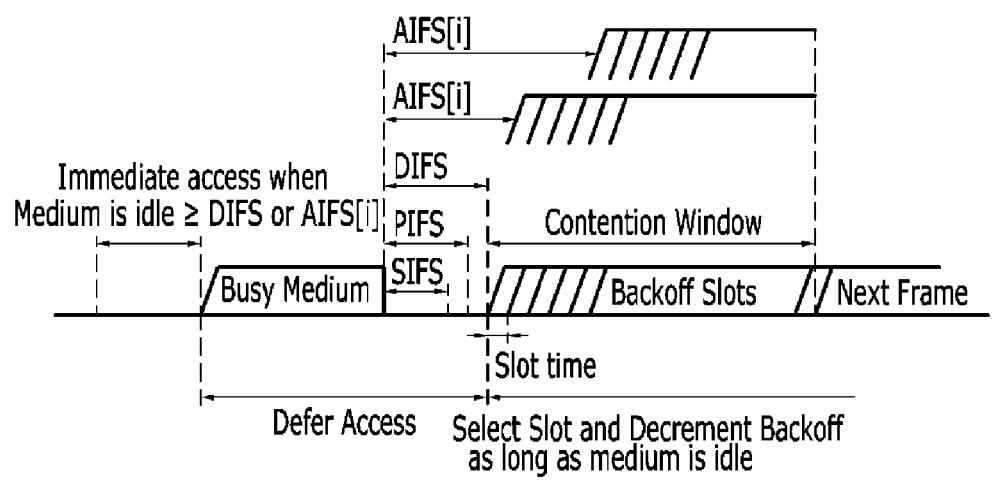
FIG. 4 exemplifies illustrates Inter-Frame Space (IFS) relationships.

FIG. 4 illustrates interframe space (IFS) relationships.

A data frame, a control frame, or a management frame may be exchanged between WLAN devices.

The data frame is used for transmission of data forwarded to a higher layer. The WLAN device transmits the data frame after performing backoff if a distributed coordination function IFS (DIFS) has elapsed from a time when the medium has been idle. The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. When the control frame is not a response frame of a previous frame, the WLAN device transmits the control frame after performing backoff when the DIFS has elapsed. When the control frame is the response frame of a previous frame, the WLAN device transmits the control frame without performing backoff when a short IFS (SIFS) has elapsed. The type and subtype of a frame may be identified by a type field and a subtype field in a frame control field.

On the other hand, a Quality of Service (QoS) STA may transmit the frame after performing backoff when an arbitration IFS (AIFS) for access category (AC), i.e., AIFS[AC], has elapsed. In this case, the data frame, the management frame, or the control frame which is not the response frame may use the AIFS[AC].

Figure 5:
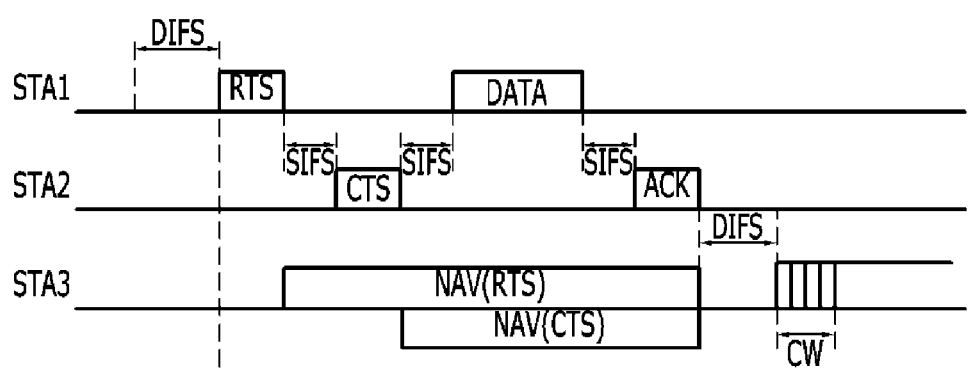
FIG. 5 is a schematic diagram illustrating a CSMA/CA based frame transmission procedure for avoiding collision between frames in a channel.

FIG. 5 is a schematic diagram illustrating a CSMA (carrier sense multiple access)/CA (collision avoidance) based frame transmission procedure for avoiding collision between frames in a channel.

Referring to FIG. 5, STA1 is a transmit WLAN device for transmitting data, STA2 is a receive WLAN device for receiving the data, and STA3 is a third WLAN device which may be located at an area where a frame transmitted from the STA1 and/or a frame transmitted from the STA2 can be received by the third WLAN device.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When it is determined that the channel is not in use by other devices during DIFS (that is, that the channel is idle), the STA1 may transmit an RTS frame to the STA2 after performing backoff. Upon receiving the RTS frame, the STA2 may transmit a CTS frame as a response of the CTS frame after a SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. For example, the NAV timer may be set for a duration of SIFS+CTS frame duration+SIFS+data frame duration+SIFS+ACK frame duration. When the STA3 receives the CTS frame, it may set the NAV timer for a transmission duration of subsequently transmitted frames (for example, a duration of SIFS+data frame duration+SIFS+ACK frame duration) by using duration information included in the RTS CTS frame. For example, the NAV timer may be set for a duration of SIFS+data frame duration+SIFS+ACK frame duration. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after a SIFS elapses.

When the NAV timer expires, the STA3 may determine whether the channel is busy by the carrier sensing. Upon determining that the channel is not in use by the other devices during DIFS after the NAV timer has expired, the STA3 may attempt the channel access after a contention window according to random backoff elapses.

Now, a frame transmitting method and a frame receiving method in a wireless communication network according to an embodiment are described with reference to the drawings. The wireless communication network according to an embodiment may be a WLAN. Particularly, the wireless communication network according to an embodiment may be a high efficiency (HE) WLAN developed by the IEEE 802.11 ax task group. Hereinafter, it is assumed for convenience that the wireless communication network according to an embodiment is the HE WLAN.

The WLAN device may determine the channel access based on an energy level or signal correlation. If detected energy is higher than a clear channel assessment (CCA) level, the device may consider that the channel is occupied. The related art uses the fixed CCA level, and a dynamic sensitivity control (DSC) technology which may dynamically adjust the CCA level has been proposed in recent years.

The WLAN device may identify a basic service set (BSS) of a received packet. If the packet is transmitted from its own BSS, the WLAN device may adjust the CCA level to be lower. If the packet is transmitted from other BSSs, the WLAN device may adjust the CCA level to be high. Applying the dynamic CCA, the WLAN device may transmit a packet to a receiver included in its own BSS, even though interference by devices of other BSSs. Therefore the dynamic CCA may increase a system throughput.

The WLAN device may use a BSS color to identify the BSS. The BSS color is unique bit information for representing the BSS. The BSS color is included in a signal field. The WLAN device identifies a BSS color of a received frame. If the BSS color of the frame is the same as its own BSS color, the WLAL device may progress decoding the received frame. If the BSS color of the frame is different from its own BSS color, the WLAN device may stop the decoding.

The WLAN device may operate a transmit power control (TPC) with a dynamic sensitivity control. The WLAN device requests adjusted transmit power to the other party. So the WLAN device may receive a packet with larger power than the CCA level by a margin or more. The WLAN device may adjust the CCA level so that the receive power is higher than the CCA level by the margin or more.

The margin is related to the receive sensitivity and may be calculated based on a signal to interference plus noise ratio for a modulation and coding scheme (MCS) of the received packet. The margin may include co-channel interference (CCI).

As such, the WLAN device may use the dynamic sensitivity control, the transmit power control, and the BSS color for interference aware communications. Next, a method for interference aware transmission (IAT) that allows the WLAN device to transmit its own interference information to the other party under, for example, various interference environments will be described in detail.

Figure 6:
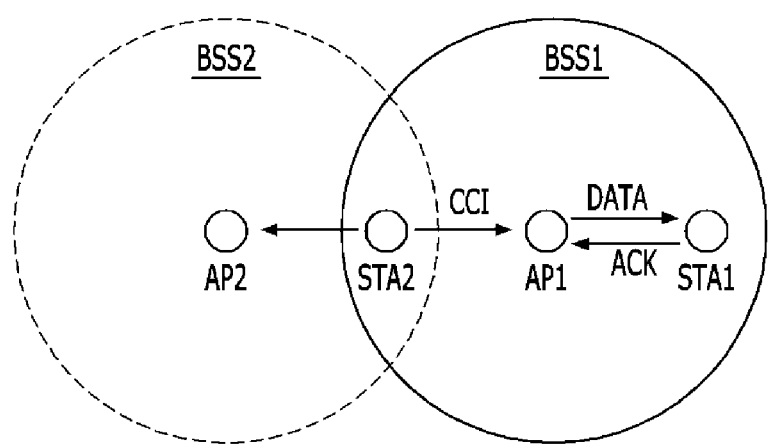
FIG. 6 shows an example of a first unsymmetrical interference condition of a wireless communication network.
Figure 7:
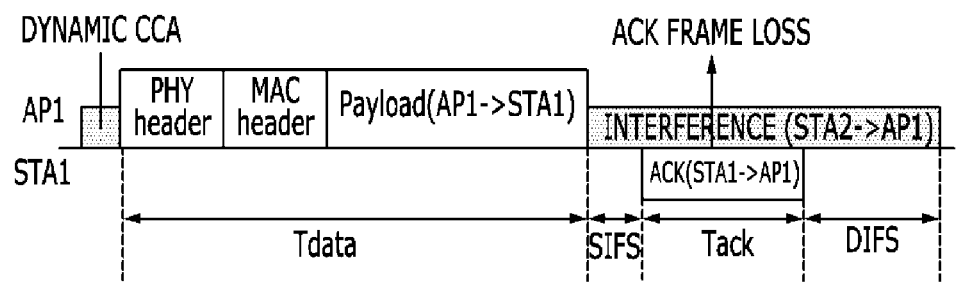
FIG. 7 schematically shows an ACK frame loss under the first unsymmetrical interference condition.

FIG. 6 shows an example of a first unsymmetrical interference condition of a wireless communication network and FIG. 7 schematically shows an ACK frame loss under the first unsymmetrical interference condition.

The first unsymmetrical interference condition is exemplarily described with FIGS. 6 and 7. The first unsymmetrical interference condition is assumed that a transmit device (sender) goes through interference by a hidden node and a receive device (receiver) does not have any information about the interference.

A wireless communication network may consist of a plurality of overlapping BSSs. For example, a WLAN communication network includes an AP1, an AP2, a STA1, and a STA2. It is assumed that the AP1 and the STA1 may be included in a BSS1, the AP2 and the STA2 may be included in a BSS2, and the STA2 may also access the AP1. Here, the AP1 is a data sender and the STA1 is a data receiver. The STA2 is an overlapping BSS (OBSS) node and is an interferer of the AP1.

The AP1 may dynamically adjust the CCA level to transmit a data frame to the STA1 even though there is the co-channel interference (CCI) of the STA2 which is the OBSS node.

The STA1 transmits an ACK frame as a response to the data frame to the AP1. The ACK frame is transmitted at a highest transmission rate in basic transmission rate sets of the BSS while being equal to or less than a transmission rate of the data frame. In this case, the ACK frame may be lost due to the interference by the STA2. Even though the ACK frame is transmitted at a low transmission rate, reception performance of the ACK frame is significantly degraded in a channel in which an interference signal is present. Due to a delay of carrier sensing, gain control, and synchronous signal processing which occur by a first input interference signal, a later input ACK frame is affected.

As such, since the data receiver is not aware of an interference condition of the data sender, even though the data receiver receives data, the data sender may not receive a response to data transmission.

Figure 8:
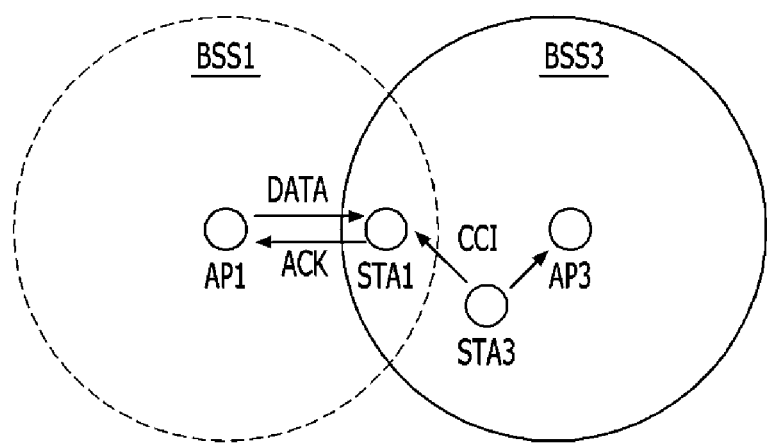
FIG. 8 shows an example of a second unsymmetrical interference condition of the wireless communication network.
Figure 9:
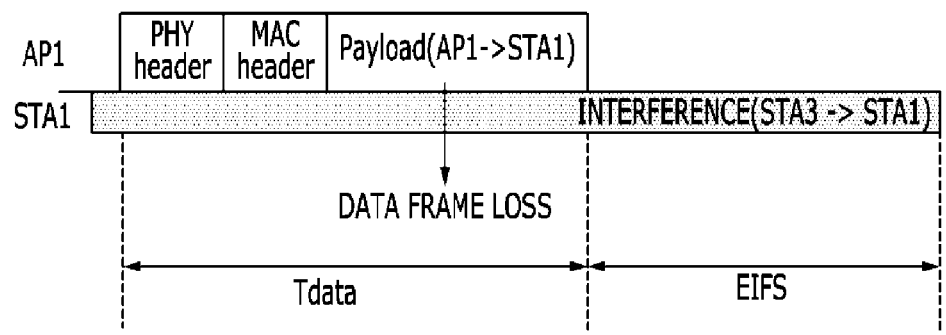
FIG. 9 schematically shows a data frame loss under the second unsymmetrical interference condition.

FIG. 8 shows an example of a second unsymmetrical interference condition of the wireless communication network and FIG. 9 schematically shows a data frame loss under the second unsymmetrical interference condition.

The second unsymmetrical interference condition is exemplarily described with FIGS. 8 and 9. The second unsymmetrical interference condition is assumed that a data receiver goes through interference by a hidden node and a data sender does not have any information about the interference.

The wireless communication network includes the AP1, an AP3, the STA1, and a STA3. It is assumed that the AP1 and the STA1 may be included in the BSS1, the AP3 and the STA3 may be included in a BSS3, and the STA3 may also access the STA1. Here, the AP1 is the data sender and the STA1 is the data receiver. The STA3 is the OBSS node and is an interferer of the STA1.

The AP1 checks a CCA and then occupies a idle channel to transmit a data frame to the STA1. However, the data frame may be lost due to the interference by the STA3.

As such, since the data sender is not aware of an interference condition of the data receiver, the data frame transmission through an interference channel may fail. The data sender is hard to know whether the data frame is properly transmitted. Even though the data sender re-transmits the data frame, the data frame loss may be repeated due to the interference at the data receiver.

Figure 10:
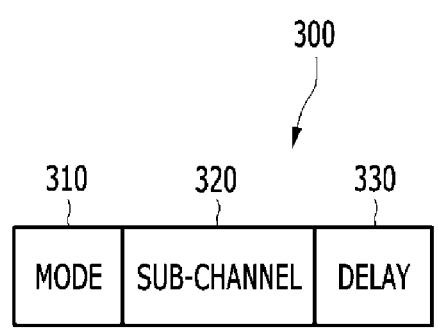
FIG. 10 shows an interference aware information field format to according to embodiment.
Figure 11:
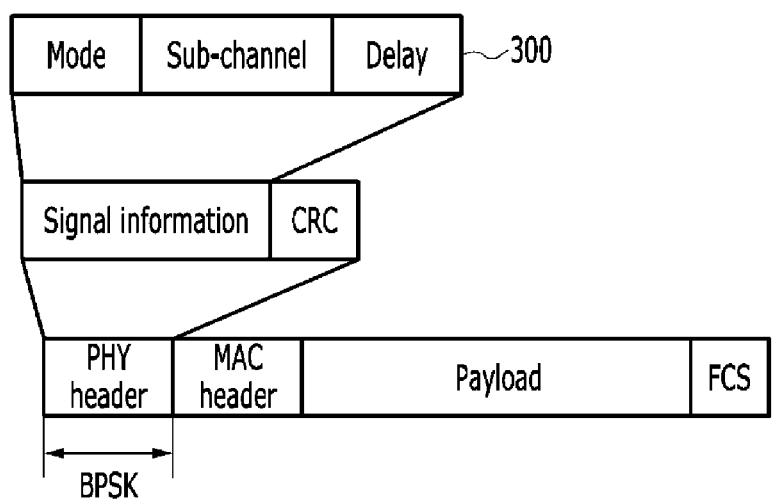
FIG. 11 shows a frame format including the interference aware information field according to an embodiment.

FIG. 10 shows an interference aware information field format to according to embodiment and FIG. 11 shows a frame format including the interference aware information field according to an embodiment.

Referring to FIG. 10, the WLAN device transmits a frame including the inference aware information. The interference aware information is included in a designated field of the transmit frame. An interference aware information field 300 may include a mode field 310, a sub-channel field 320, and a delay field 330. The mode field and the delay field may be optional.

The mode field 310 indicates an interference aware mode designated in the interference aware communications. The interference aware mode may be defined variously. The mode field may indicate whether the interference aware transmission is supported.

The mode field 310 may be defined as in, for example, the following Table 1. Here, an interference aware ACK (IAA) mode may be set by the transmit device affected by the interference. Upon receiving a frame in which the interference aware ACK mode is set, the receive device transmits the ACK frame by referring to the sub-channel field and the delay field. A dynamic channel access (DCA) mode may be set by the transmit device supporting a dynamic channel access. Upon receiving the frame in which the dynamic channel access mode is set, the receive device may request the dynamic channel access to the transmit device.

TABLE 1

| Mode field | Meaning |
| --- | --- |
| 0 | Not support |
| 1 | Interference aware ACK (IAA) mode |
| 2 | Dynamic channel access (DCA) mode |

The sub-channel field 320 indicates an available sub-channel. According to one exemplary embodiment, a sub-channel field value may be defined as an integer value indicating the sub-channel designated as in the following Table 2. When the number of available sub-channels is plural, the interference aware information field 300 may include a plurality of sub-channel fields. According to another exemplary embodiment, the sub-channel field value may be defined as a bit map. For example, in an 80 MHz bandwidth, a sub-channel field value "1000" indicates a first 20 MHz sub-channel and a sub-channel field value "0101" indicates a second 20 MHz sub-channel and a fourth 20 MHz sub-channel. When the number of available sub-channels is plural, it may be effective to indicate the sub-channels by a bit map scheme, not an integer representation scheme.

When there is no mode field in the interference aware information field, it may be determined whether the interference aware transmission is supported based on the sub-channel field value. For example, if the sub-channel field value is zero, it means that the interference aware transmission is not supported. If the sub-channel field value is non-zero, it means that the interference aware transmission is supported.

TABLE 2

| Sub-channel field | Meaning |
| --- | --- |
| 0 | When there is no mode field, "0" means that the interference aware transmission is not supported |
| 1 | Sub-channel #1 |
| 2 | Sub-channel #2 |
| 3 | Sub-channel #3 |
| ... | ... |
| n-1 | Sub-channel #n-1 |
| n | Sub-channel #n |

The delay field 330 indicates the delay transmission of the ACK frame. For example, the delay field may be defined as in the following Table 3.

TABLE 3

| Delay field | Meaning |
| --- | --- |
| 0 | Immediate transmission of ACK frame (After SIFS) |
| 1 | Delay transmission of 1 ACK frame (delay time = transmit timing of ACK frame + SIFS) |
| ... | ... |
| n | Delay transmission of n ACK frame |

The interference aware information field may be included in a PHY header or an MAC header of a transmission frame. When the transmit device transmits the frame including the interference aware information field, the receive device decodes signal information of the received frame to identify the interference aware information.

Referring to FIG. 11, the interference aware information field may be included in the signal field.

The transmission frame includes the PHY header, the MAC header, a payload, and a frame check sequence (FCS) protecting the payload. The receive device checks the FCS included in the frame and then decodes the payload. If there is the interference, the received frame may not pass through the FCS check. However, the signal field including the signal information is modulated by a robust modulation and coding technology like binary phase shift keying (BPSK). Therefore, even though there is the interference, the received frame may pass through a cyclic redundancy check (CRC) inserted for protecting the signal field.

Therefore, even though the receive device is affected by the interference, the receive device can identify the interference aware information included in the signal field. The receive device may acquire the interference aware information and request data transmission to the transmit device by the dynamic channel access.

Figure 12:
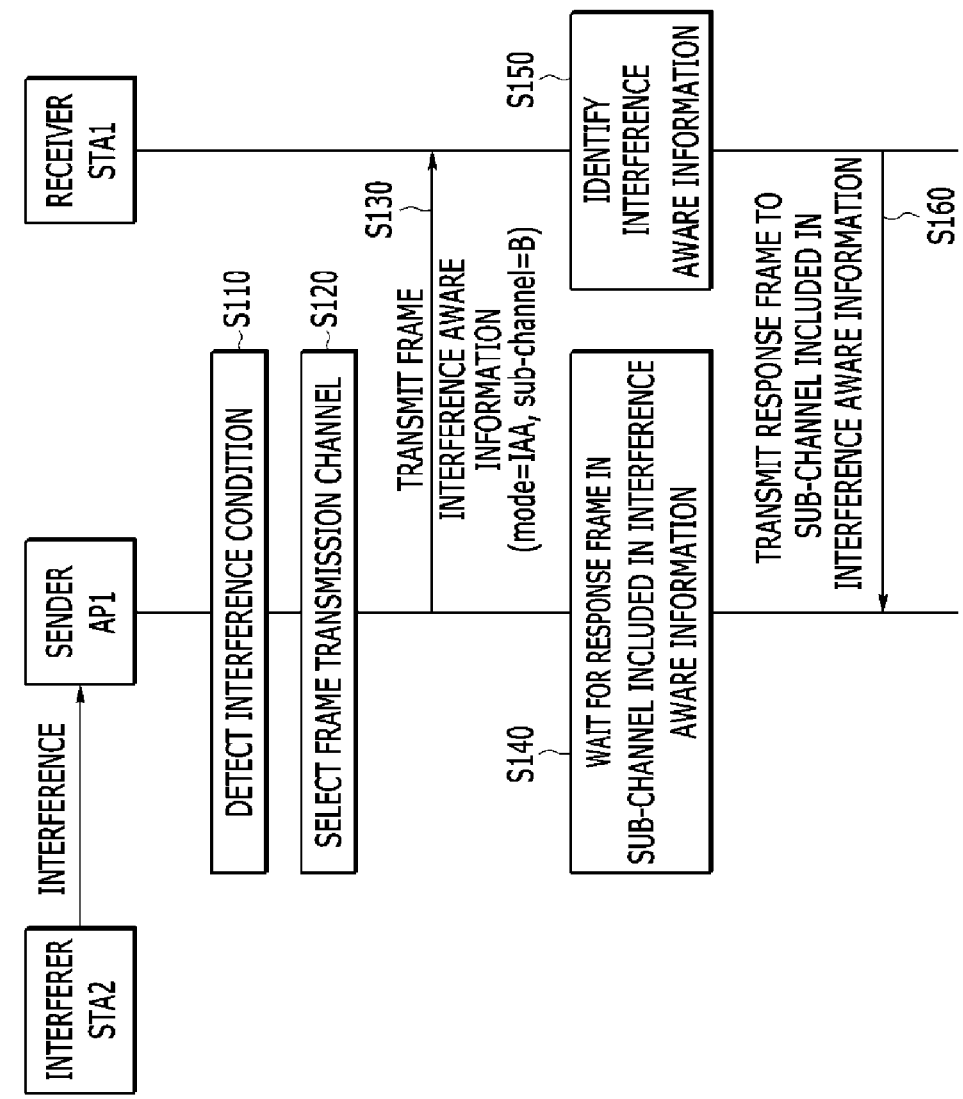
FIG. 12 is a flow chart showing a method for interference aware transmission according to an embodiment.

FIG. 12 is a flow chart showing a method for interference aware transmission according to an embodiment and FIGS. 13 to 16 schematically show frame transmissions of the method for interference aware transmission according to an embodiment.

Figure 13:
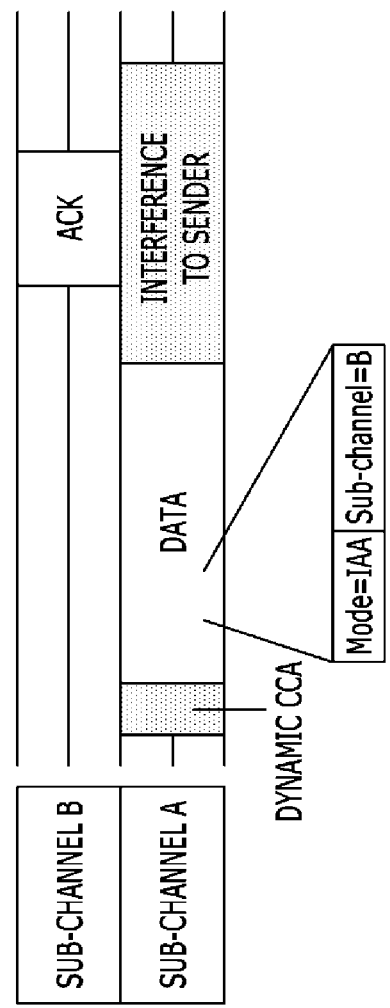
FIGS. 13, 14, 15, and 16 schematically show frame transmissions of the method for interference aware transmission according to an embodiment.

First, a method of first interference aware transmission will be described with FIGS. 12 and 13. We can call the method of first interference aware transmission as a method of interference aware ACK (IAA) transmission for convenience. Next, the method of first inference aware transmission will be described under, for example, the first unsymmetrical interference condition of FIG. 6.

The sender AP1 and the receiver STA1 are the WLAN device supporting interference aware transmission (IAT). The STA2 is an interferer of the sender AP1. It is assumed that the BSS of the interferer STA2 is different from the BSS of the sender AP1.

The sender detects an interference condition of a radio channel (S110). The sender may detect its own interference condition by various methods.

The sender selects a frame transmission channel based on the interference condition (S120). The sender may determine the transmission channel based on the dynamic sensitivity control. Even though there is interference in a sub-channel A due to the interferer, the sender may select the sub-channel A as a transmission channel using the dynamic CCA.

The sender transmits the frame including the interference aware information to the receiver (S130). The interference aware information includes information to allow the receiver to be aware of the interference condition of the sender. The interference aware information is included in the interference aware information field. The interference aware information field may include the sub-channel field and further include the mode field. When there is interference over a reference in the sub-channel A for the frame transmission, the sender transmits a frame including interference aware information (mode=IAA, sub-channel=B) to the receiver. That is, when there is the interference over the reference in the sub-channel A, the sender informs the receiver to transmit the ACK frame using the sub-channel B.

The sender waits for a response frame in the sub-channel informed as the interference aware information (S140).

The receiver receives the frame transmitted from the sender and identifies the interference aware information included in the received frame (S150).

The receiver transmits the response frame to the sub-channel indicated in the interference aware information (S160).

The method for first interference aware transmission under various wireless environments will be described with reference to FIGS. 14 to 16. Here, an 80 MHz band will be described as an example but the exemplary embodiment is not limited thereto.

Figure 14:
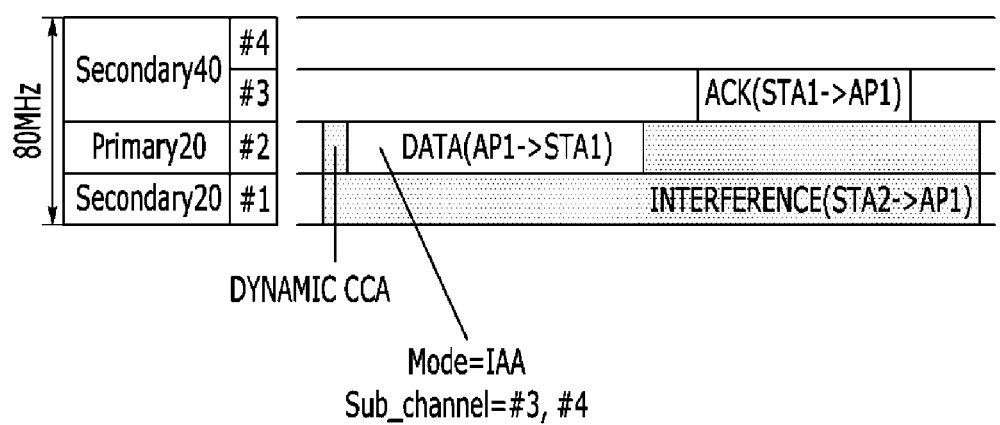

Referring to FIG. 14, in sub-channels #1 and #2, the STA2 which is the OBSS node gives the interference to the AP1. The AP1 may perform the dynamic CCA check before transmitting data to the STA1 and transmit the data frame to the sub-channel #2 in which the interference is present. In this case, the AP1 inserts the interference aware information into the data frame. For example, the AP1 sets the IAA in the mode field and sets the ACK frame transmission channel to be sub-channels #3 and #4.

The STA1 identifies the mode field and the sub-channel field which are included in the received frame. The STA1 may transmit the ACK frame using any one of the sub-channels set in the sub-channel field.

Figure 15:
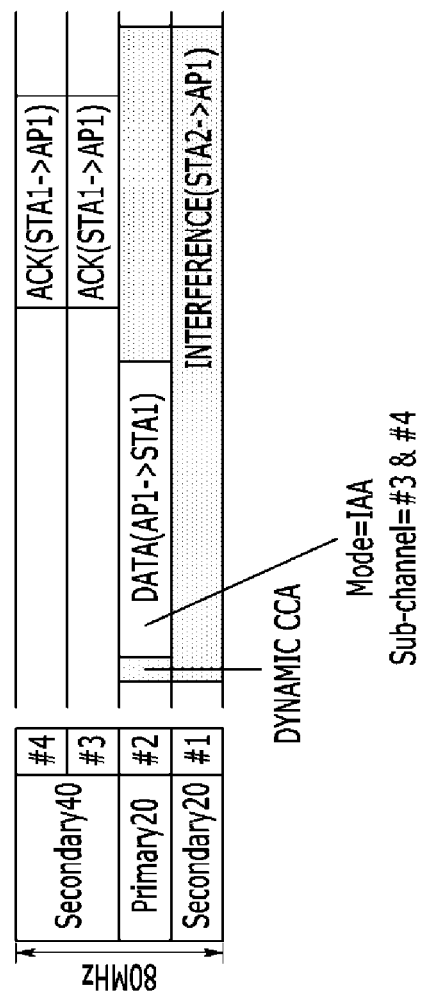

Referring to FIG. 15, the AP1 may set the IAA in the mode field of the data frame and set the ACK frame transmission channel as the sub-channels #3 and #4.

The STA1 identifies the mode field and the sub-channel field which are included in the received frame. The STA1 transmits the ACK frame using the sub-channels #3 and #4 set in the sub-channel field.

Figure 16:
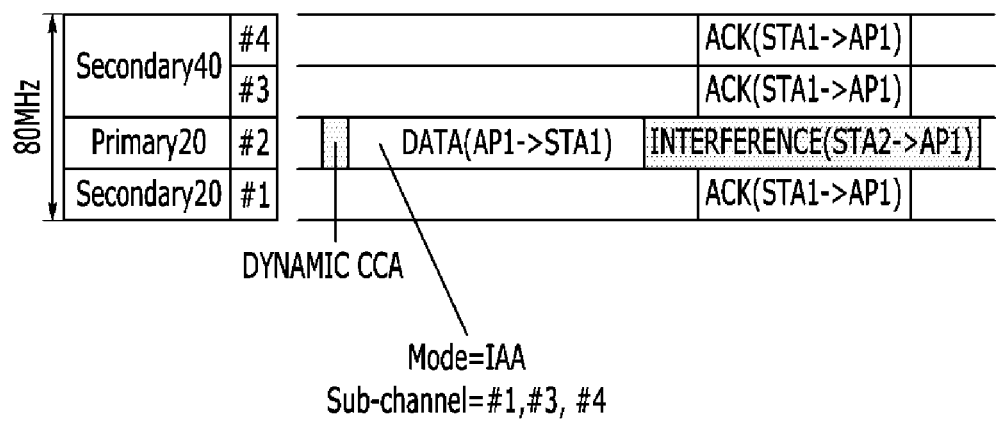

Referring to FIG. 16, in sub-channel #2, the STA2 which is the OBSS node gives the interference to the AP1. The AP1 may perform the dynamic CCA check and transmit the data frame to the sub-channel #2 in which the interference is present. In this case, the AP1 may set the IAA in the mode field of the data frame and set the ACK frame transmission channel as the sub-channels #1, #3 and #4.

The STA1 identifies the mode field and the sub-channel field which are included in the receive frame. The STA1 may transmit the ACK frame to all the sub-channels set in the sub-channel field.

Figure 17:
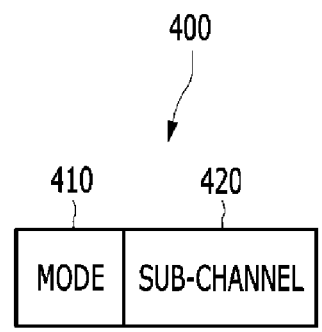
FIG. 17 shows a field format included in a NACK frame to an embodiment.

FIG. 17 shows a field format included in a NACK frame to an embodiment.

Referring to FIG. 17, the NACK frame includes an interference aware information field 400. The interference aware information field 400 may include a mode field 410 and a sub-channel field 420. The NACK frame may include the mode field 410 and the sub-channel field 420 in the same format as the ACK frame. The interference aware information field 400 may be included in a PHY header or an MAC header of the NACK frame. The NACK frame type may be defined in a sub type field of the MAC header.

The mode field 410 may indicate a frame type. That is, the mode field 410 indicates the NACK frame.

The sub-channel field 420 indicates the sub-channel. In particular, the sub-channel field 420 may include a recommended sub-channel for next data frame transmission.

According to another exemplary embodiment, the NACK frame may include an NACK indicator. The NACK frame may transmit the NACK indicator along with at least one of the mode field 410 and the sub-channel field 420. Alternatively, the NACK frame may transmit only the NACK indicator, instead of the interference aware information field 400. Here, the NACK indicator indicates that the signal is not successfully received due to the interference. Upon receiving the NACK frame including the NACK indicator, the data sender may be aware of the interference condition of the data receiver. Therefore, the data sender may transmit the signal to the data receiver by increasing the transmit power or decreasing the MCS. Alternatively, the data sender may transmit data using any sub-channel different from the previous data transmission channel.

When the sender transmits the data frame in any sub-channel, the receiver may not properly receive the data frame due to the interference. In this case, the receiver transmits the NACK frame to the sender. That is, the NACK frame informs a receiving failure of the data frame and requests data retransmission using other sub-channels. The NACK frame is transmitted between the WLAN devices supporting the interference aware transmission (IAT) technology.

Next, the method for interference aware transmission using the NACK frame will be described.

Figure 18:
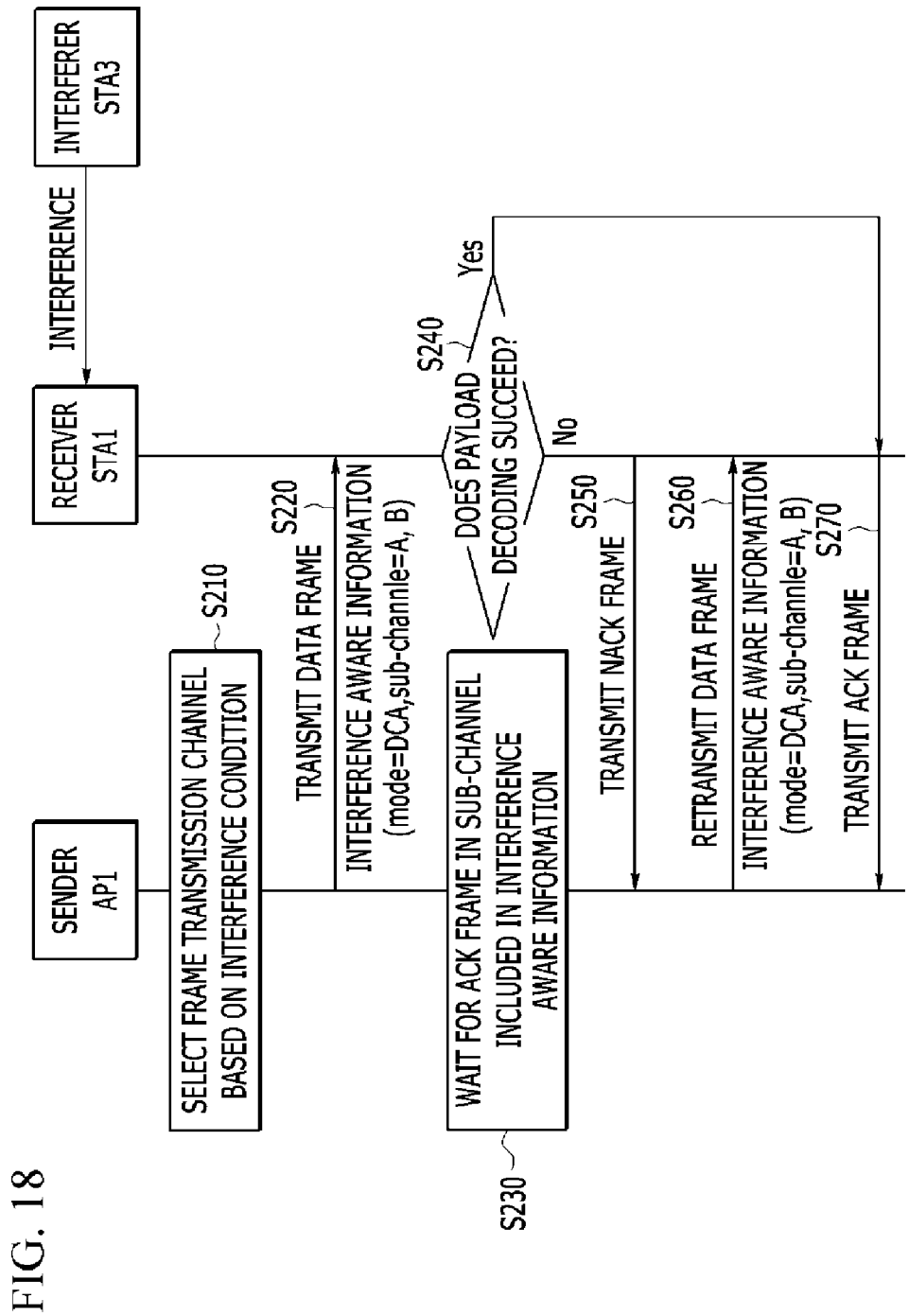
FIG. 18 is a flow chart showing a method for interference aware transmission according to an embodiment.

FIG. 18 is a flow chart showing a method for interference aware transmission according to an embodiment and FIGS. 19 to 24 schematically show frame transmissions of a method for interference aware transmission according to an embodiment.

Figure 19:
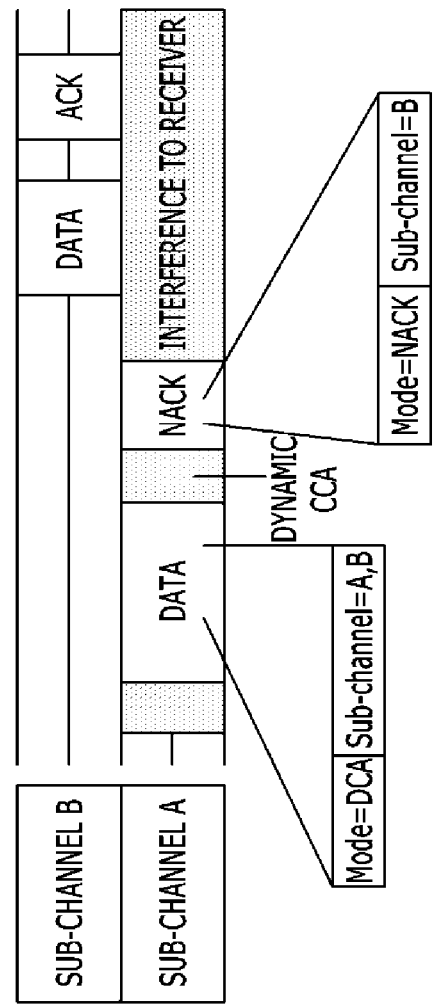
FIGS. 19, 20, 21, 22, 23, and 24 schematically show frame transmissions of a method for interference aware transmission according to an embodiment.

First, a method of second interference aware transmission will be described with FIGS. 18 and 19. We can call the method of second interference aware transmission as a method of dynamic channel access (DCA) for convenience. Next, the method of second inference aware transmission will be described under, for example, the second unsymmetrical interference condition of FIG. 8.

The data sender AP1 and the data receiver STA1 are the WLAN device supporting the interference aware transmission (IAT). The interferer STA3 is an interferer of the receiver STA1. It is assumed that the BSS of the interferer STA3 is different from the BSS of the AP1.

The sender selects the frame transmission channel based on the interference condition (S210). The sender may detect its own interference condition by various methods and may perform the dynamic sensitivity control. When the sub-channel A and the sub-channel B are idle, the sender may select at least one of the sub-channel A and the sub-channel B for frame transmission channel. Here, the idle sub-channel is a channel with the interference below the reference and a reference value may be set dynamically.

The sender transmits the data frame including the interference aware information to the receiver (S220). The sender transmits interference aware information (mode=DCA, sub-channel=A, B) including idle channel information to the receiver. That is, the sender supports its own dynamic channel access and informs that the sub-channel A and the sub-channel B are idle.

The sender waits for the ACK frame in the sub-channel informed as the interference aware information (S230).

The receiver decodes the data frame (S240).

Upon failing payload decoding, the receiver transmits the NACK frame based on the interference aware information (S250). Even though the payload decoding fails, the interference aware information included in the signal field may be decoded. The receiver can be aware that the sender supports the dynamic channel access to avoid the interference. The receiver transmits the NACK frame to inform the receiving failure of the data frame. The receiver may transmit the NACK frame using at least one of the sub-channels included in the interference aware information. The NACK frame may include a recommended sub-channel for the data frame retransmission.

The sender receives the NACK frame and retransmits the data frame in a different sub-channel from the previously used sub-channel (S260). The data frame may include the interference aware information (mode=DCA, sub-channel=A, B). The sender may retransmit the data frame using the sub-channel indicated in the NACK frame. Alternatively, the sender may select the different sub-channel from the previously used sub-channel.

Upon succeeding the payload decoding, the receiver transmits the ACK frame based on the interference aware information (S270).

Meanwhile, the NACK frame may not be used in the interference aware transmission. Or the NACK frame may not be successfully transmitted to the sender. If the sender does not receive a response to the data frame transmission for a predetermined time, he/she may select the different sub-channel from a previous channel to retransmit the data frame.

The method of second interference aware transmission under various wireless environments will be described with FIGS. 20 to 24.

Figure 20:
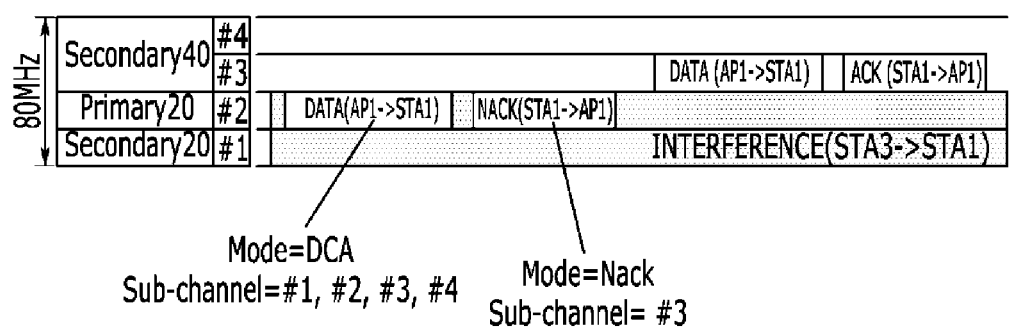

Referring to FIG. 20, in the sub-channels #1 and #2, the STA3 which is the OBSS node gives the interference to the STA1. The AP1 transmits the data frame to the STA1 in the sub-channel #2. In this case, the AP1 inserts interference aware information (mode=DCA, sub-channel=#1, #2, #3, #4) into the data frame. The interference aware information is included in the signal field.

Upon failing in the payload decoding due to the interference of the STA3, the STA1 transmits a NACK frame (mode=Nack, sub-channel=#3) to the AP1.

The AP1 retransmits the data frame in the sub-channel #3 indicated in the NACK frame.

The AP1 receives the ACK frame in the sub-channel #3.

Figure 21:
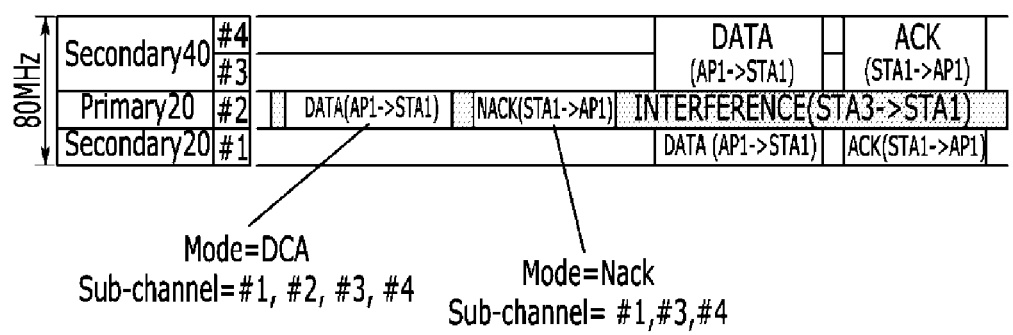
Figure 22:
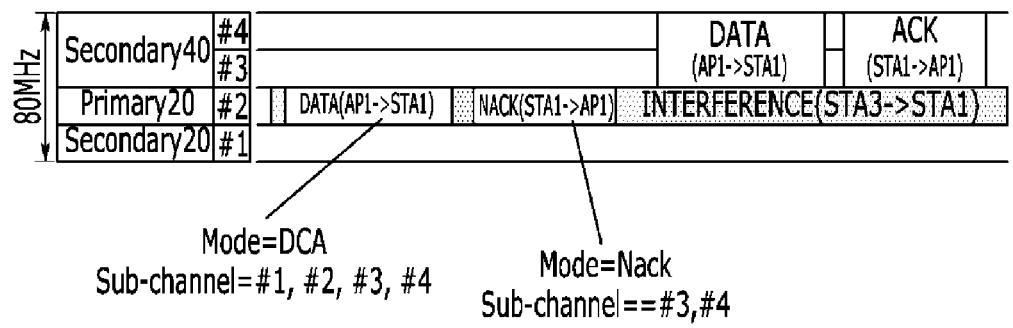

Referring to FIGS. 21 and 22, in the sub-channel #2, the STA3 which is the OBSS node gives the interference to the STA1. The AP1 transmits the data frame to the STA1 in the sub-channel #2. In this case, the AP1 inserts interference aware information (mode=DCA, sub-channel=#1, #2, #3, #4) into the data frame.

The STA1 fails the payload decoding and then transmits the NACK frame (mode=Nack, sub-channel=#1, #3, #4) to the AP1. The NACK frame may include the plurality of available sub channel information.

The AP1 retransmits the data frame using some or all of the sub-channels indicated in the NACK frame.

The AP1 receives the ACK frame in the sub-channels through which the data frame is transmitted.

Figure 23:
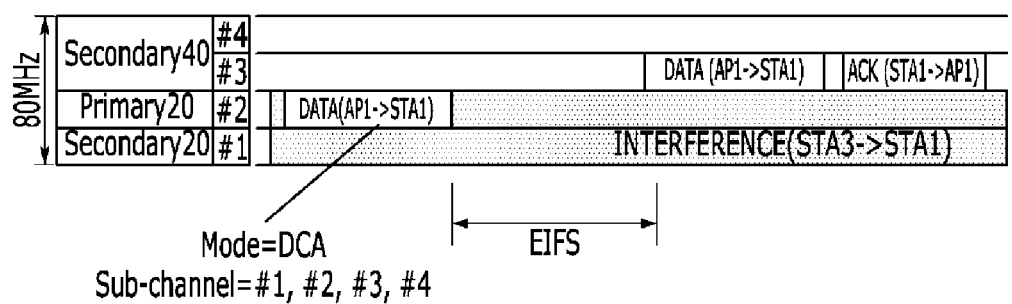
Figure 24:
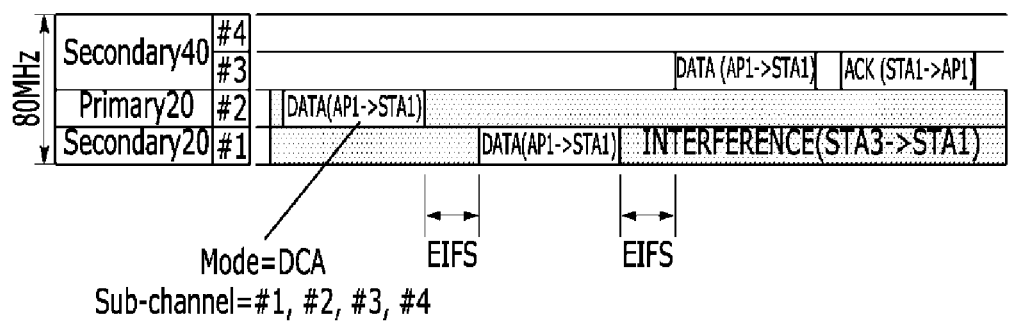

Referring to FIGS. 23 and 24, the method for interference aware transmission may not use the NACK frame.

The AP1 does not know the interference condition of the STA1 and transmits the data frame to the STA1 in the sub-channel #2. In this case, the AP1 inserts the interference aware information (mode=DCA, sub-channel=#1, #2, #3, #4) into the data frame.

When the AP1 does not receive the response to the data frame for a predetermined time (for example, EIFS), the AP1 selects the different sub-channel from the previously used sub-channel for retransmitting the data frame.

The AP1 does not know the interference condition of the STA1. Therefore the AP1 may select the idle sub-channel #3 as illustrated in FIG. 23, or select the sub-channel #1 with the interference as illustrated in FIG. 24. When the AP1 does not receive the response even in the sub-channel #1, the AP1 may select the remaining sub-channel #3 for retransmitting the data frame.

Figure 25:
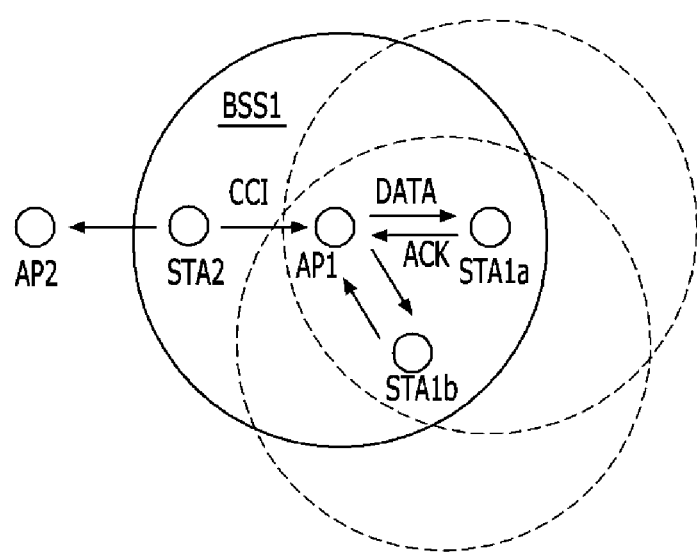
FIG. 25 shows an example of a third unsymmetrical interference condition of the wireless communication network.

FIG. 25 shows an example of a third unsymmetrical interference condition of the wireless communication network and FIGS. 26 to 29 schematically show frame transmissions of a method for interference aware communications according to an embodiment.

First, the third unsymmetrical interference condition under the OFDM transmission environment between multiple users will be exemplarily described with FIG. 25.

The wireless communication network may consist of the plurality of overlapping BSSs. For example, the wireless communication network includes the AP1, the AP2, a STA1a, a STA1b, and the STA2. It is assumed that the AP1, the STA1a, and the STA1b may be included in the BSS1, the AP2 and the STA2 may be included in the BSS2. The BSS1 and the BSS2 overlap with each other and the STA2 may also access the AP1. Here, the AP1 is the data sender and the STA1a and the STA1b are the data receivers. The STA2 is the OBSS node and is the interferer of the AP1.

Figure 26:
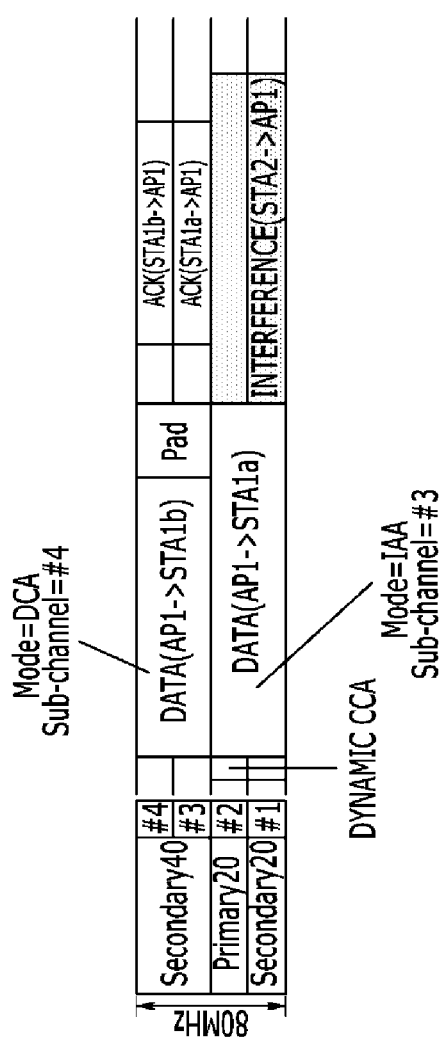
FIGS. 26, 27, 28, and 29 schematically show frame transmissions of a method for interference aware communications according to an embodiment.

Referring to FIGS. 25 and 26, the AP1 detects the interference of the sub-channels before transmitting data to the STA1a and the STA1b. The AP1 detects the interference affected by the STA2 in the sub-channels #1 and #2.

The AP1 may transmit the data frame of the STA1a to the sub-channels #1 and #2 using the dynamic CCA. The AP1 may transmit the data frame of the STA1b to the idle sub-channels #3 and #4.

In this case, since the interference due to the OBSS node is present in the sub-channels #1 and #2, the AP1 informs the STA1a of idle channel for the ACK frame transmission. That is, the AP1 transmits the data frame including the interference aware information (mode=IAA, sub-channel=#3) to the STA1a.

Meanwhile, since the AP1 does not know the interference condition of the receiver, the AP1 informs the STA1b of the dynamic channel access supporting. Further, the AP1 informs the STA1b of idle channel for the ACK frame transmission. That is, the AP1 transmits the data frame including the interference aware information (mode=DCA, sub-channel=#4) to the STA1b.

The STA1a and the STA1b respectively confirm the sub-channel included in the data frame and transmit the ACK frame to the corresponding sub-channel.

Next, the case in which the STA2 which is the OBSS node gives the interference in wide channel will be described as an example.

Figure 27:
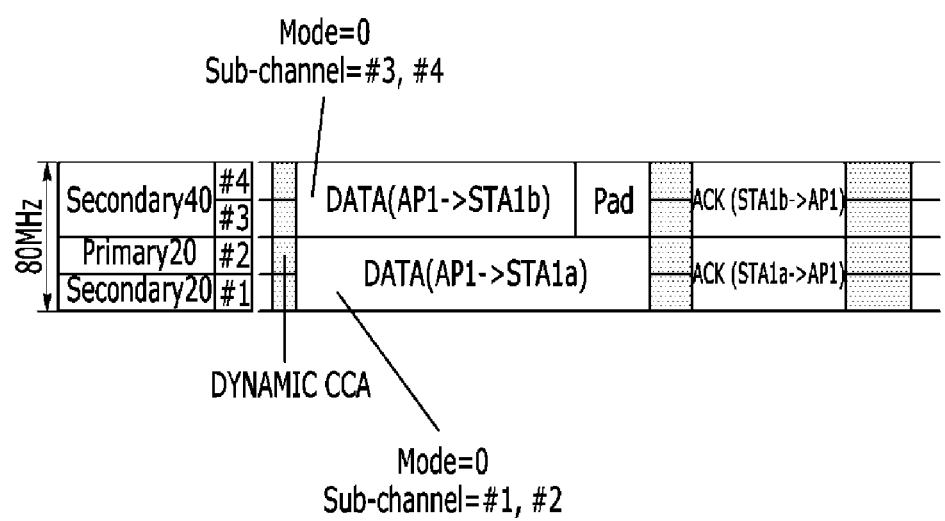

Referring to FIGS. 25 and 27, the AP1 detects the interference of the sub-channels before transmitting data to the STA1a and the STA1b. It is assumed that the STA2 is an interferer in all the sub-channels.

The AP1 may transmit the data frame of the STA1a to the sub-channels #1 and #2 and transmit the data frame of the STA1b to the sub-channels #3 and #4 using the dynamic CCA.

The AP1 may determine whether the ACK frame may be successfully received in the channel through which the data frame is transmitted. Upon receiving the ACK frame as a result of determining the intensity of the interference, the AP1 waits for the ACK frame in the channel through which the data frame is transmitted.

The AP1 may set the recommended channel for the ACK frame transmission in the data frame. For example, the AP1 may transmit the data frame including interference aware information (mode=0, sub-channel=#1, #2) to the STA1a and transmit the data frame including interference aware information (mode=0, sub-channel=#3, #4) to the STA1b.

The STA1a and the STA1b respectively transmit the ACK frame to the sub-channel recommended in the data frame.

Figure 28:
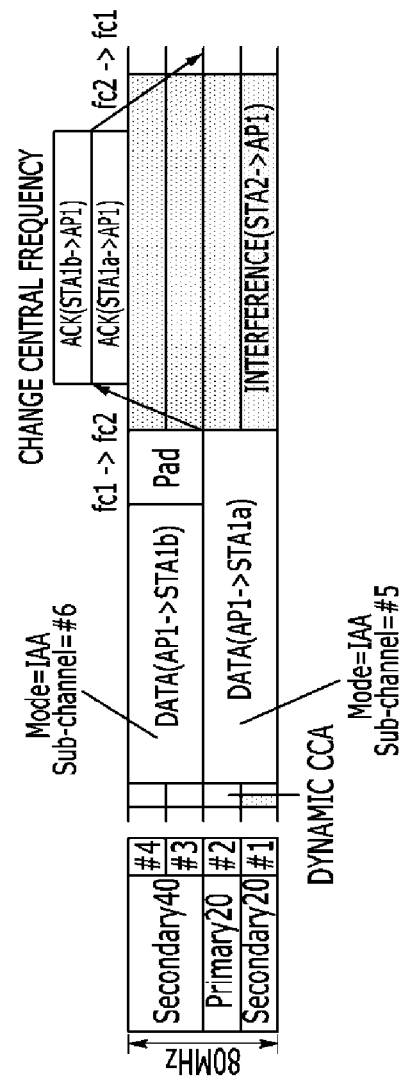

Referring to FIGS. 25 and 28, when there is the interference in all the sub-channels, the AP1 determines whether the ACK frame may be successfully received in the channel through which the data frame is transmitted. When the ACK frame may not be received in all the sub-channel as a result of determining the intensity of the interference, the AP1 can receive the ACK frame in adjacent channels.

The AP1 instructs each of the STA1a and STA1b to transmit the ACK frame to the adjacent channels. That is, the AP1 may transmit a data frame including interference aware information (mode=IAA, sub-channel=#5) to the STA1a and transmit a data frame including interference aware information (mode=IAA, sub-channel=#6) to the STA1b.

The AP1 temporarily changes a central frequency to the adjacent channels (change central frequency from fc1 to fc2) and waits for the ACK frame in the sub-channels #5 and #6.

The STA1a and the STA1b each transmit the ACK frame to the sub-channel included in the data frame. The STA1a and the STA1b each temporarily change the central frequency to the adjacent channels to transmit the ACK frame.

According to another exemplary embodiment, when the ACK frame may not be received in all the sub-channels, the WLAN device may change a filter bandwidth to transmit/receive the frame.

Figure 29:
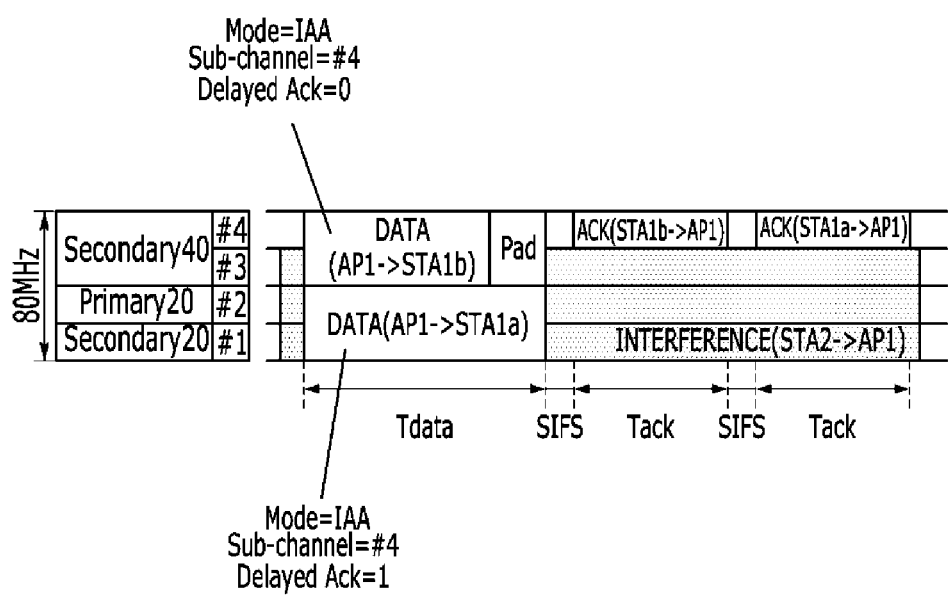

Referring to FIGS. 25 and 29, the interference is present in some of the sub-channels #1 to #3 and the sub-channel #4 may be idle. In this case, the AP1 may receive the ACK frame in the sub-channel #4. However, if the multiple users access to the AP1, the number of channels for the ACK frame reception may be insufficient.

The AP1 may inform each of the STA1a and STA1b of ACK frame transmission time. That is, the AP1 may transmit a data frame including interference aware information (mode=IAA, sub-channel=#4, delayed ack=1) to the STA1a and transmit the data frame including the interference aware information (mode=IAA, sub-channel=#4, delayed ack=0) to the STA1b. The AP1 sets a duration field based on whether the delay transmission of the ACK frames of each of the STA1a and the STA1b is made. Upon delaying the STA1a by a 1 ACK frame, the AP1 adds a delayed duration (SIFS+ACK frame) by the delayed ACK frame to a duration value in a normal state.

The STA1b transmits the ACK frame to the sub-channel #4 without being delayed based on the interference aware information. The STA1b transmits the ACK frame after the SIFS elapses from the data transmission time.

The STA1a waits for the ACK frame transmission based on the interference aware information and then transmits the ACK frame at its own transmit timing. The STA1a may transmit the ACK frame after the SIFS elapses from the ACK frame transmission time of the STA1b.

As such, when the number of idle sub-channels is smaller than the number of users, the insufficient sub-channel is time-divided and thus the ACK frame transmission of the multiple users may be supported. For the delayed transmission of the ACK frame, the data sender may set ACK frame transmission policies for each data receiver.

Figure 30:
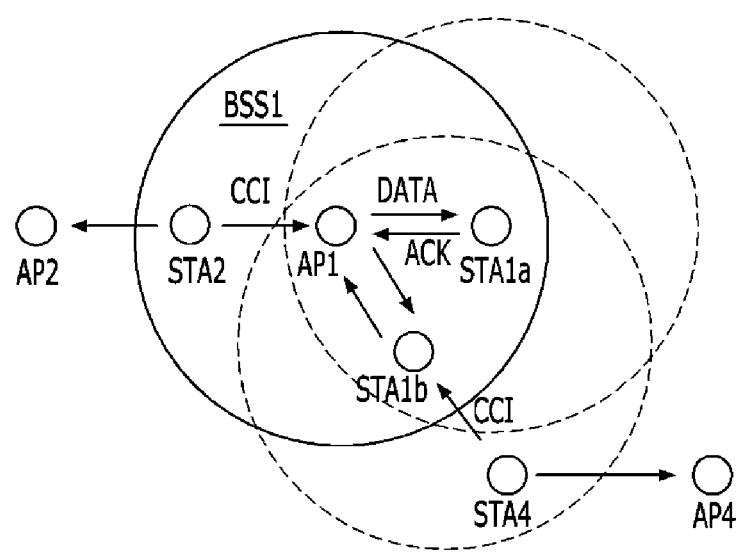
FIG. 30 shows an example of a fourth unsymmetrical interference condition of the wireless communication network.
Figure 31:
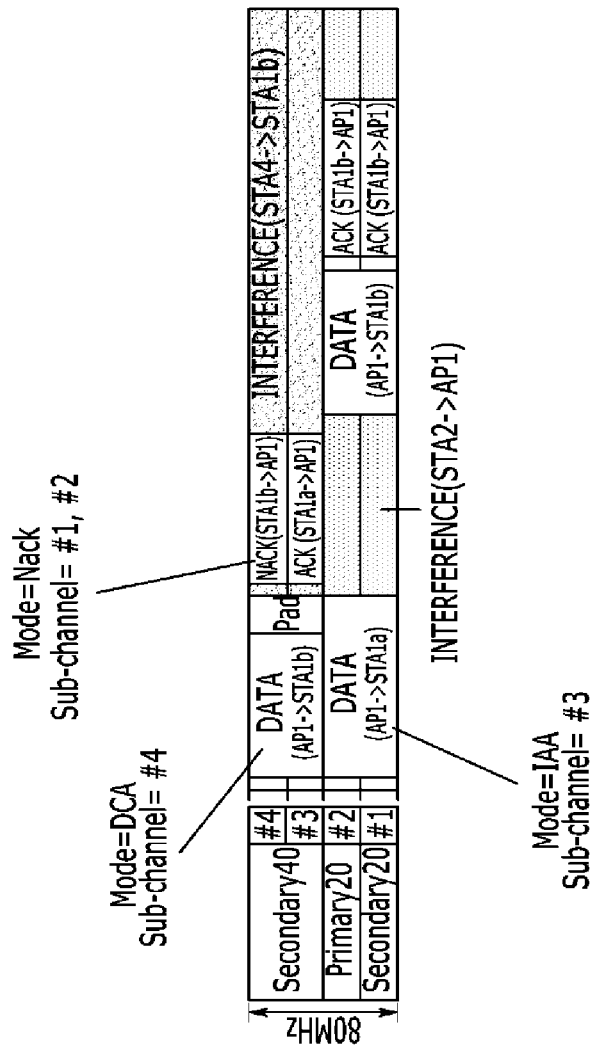
FIG. 31 schematically shows frame transmissions of a method for interference aware communications according to an embodiment.

FIG. 30 shows an example of a fourth unsymmetrical interference condition of the wireless communication network and FIG. 31 schematically shows frame transmissions of a method for interference aware communications according to an embodiment.

FIG. 30 shows that a BSS4 additionally overlaps under the third unsymmetrical interference condition of the wireless communication network described with FIG. 25. It is assumed that the BSS4 may include an AP4 and a STA4, and the STA4 may also access the STA1b. The STA4 is the OBSS node and is an interferer of the STA1b.

Referring to FIGS. 30 and 31, the AP1 detects the interference of the sub-channels before transmitting data to the STA1a and the STA1b. The AP1 may know the interference condition of the sub-channels #1 and #2. However, since the AP1 may not know the interference condition that the STA1b is affected by the STA4 in the sub-channels #3 and #4, the AP1 may determine the sub-channels #3 and #4 as the idle channel.

As described with reference to FIG. 26, the AP1 may transmit the data frame including interference aware information (mode=IAA, sub-channel=#3) to the STA1a and transmit the data frame including the interference aware information (mode=DCA, sub-channel=#4) to the STA1b.

The STA1a transmits the ACK frame to the sub-channel #3 included in the data frame.

Meanwhile, the STA1b corresponds to the data receiver under the second unsymmetrical interference condition described with FIG. 16. The STA1b fails in the payload decoding due to the interference by the STA4. Next, the STA1b transmits the NACK frame using the sub-channel #4, based on the interference aware information acquired by decoding the signal field. The NACK frame may include sub-channel information (mode=Nack, sub-channel=#1, #2) for re-transmission.

The AP1 receives the NACK frame and retransmits the data frame to the STA1b using the sub-channels #1 and #2 indicated in the NACK frame.

The STA1b successfully receives data in the sub-channels #1 and #2 without interference and transmits the ACK frame.

Figure 32:
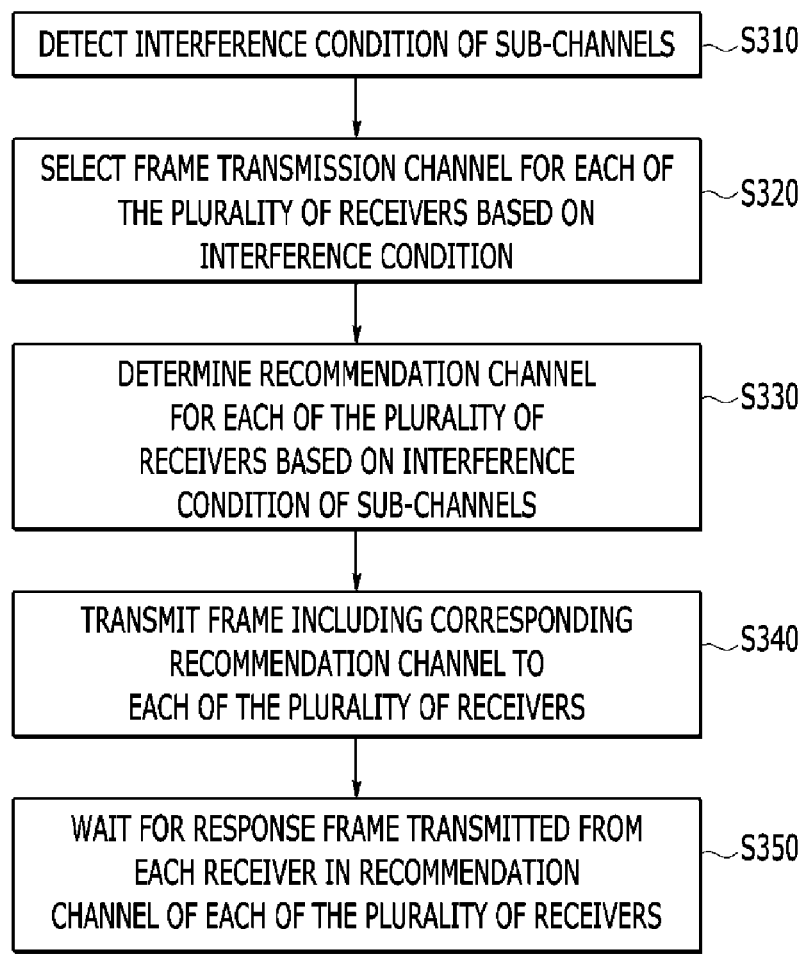
FIGS. 32 and 33 are flow charts showing a method for interference aware communications for multiple users according to an embodiment.
Figure 33:
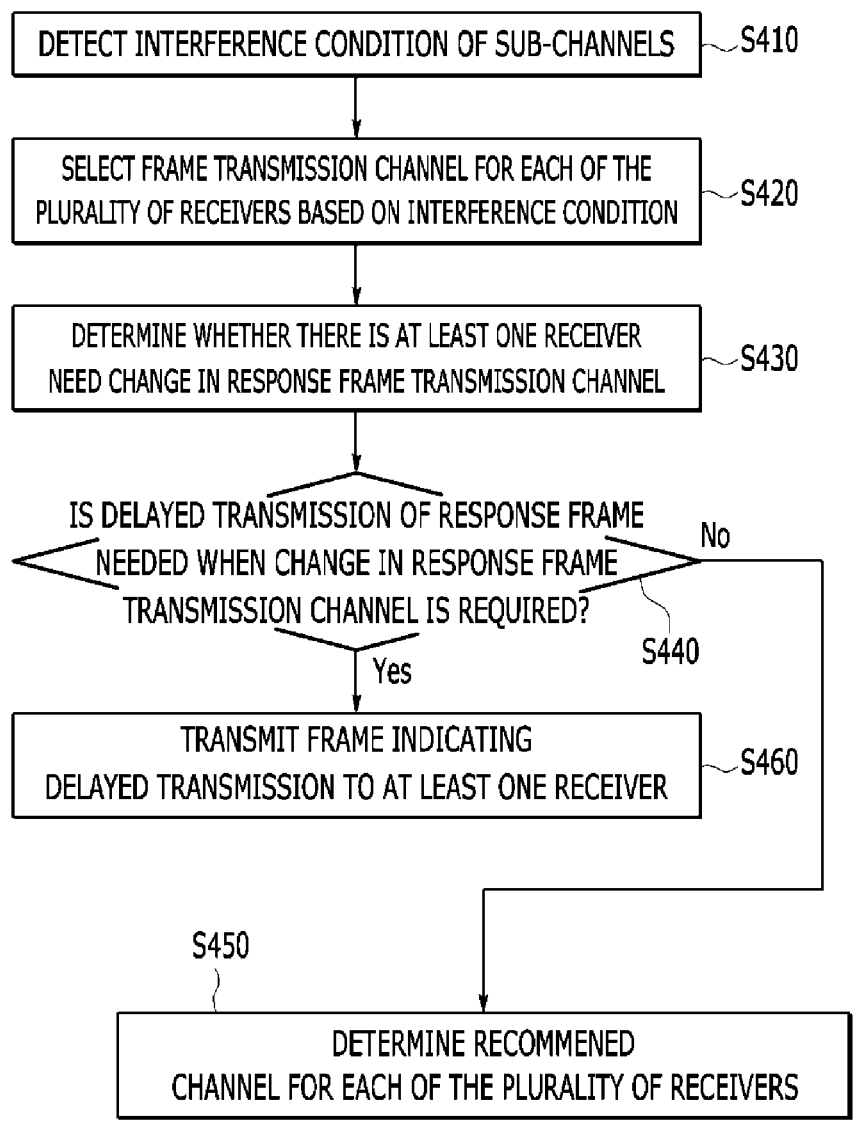

FIGS. 32 and 33 are flow charts showing a method for interference aware communications for multiple users according to an embodiment.

Referring to FIG. 32, the transmit device detects the interference condition of the sub-channels (S310).

The transmit device selects frame transmission channels for each of the plurality of receive devices based on the interference condition (S320). The transmit device may detect the interference and transmit data to the sub-channel with interference using the dynamic sensitivity control.

The transmit device determines recommendation channels for each of the plurality of receive devices based on the interference condition of the sub-channels (S330). As described with reference to FIG. 26, when the number of idle sub-channels are equal to or more than the number of receivers, the transmit device may recommend the idle sub-channel, if the response frame loss due to the interference is expected. As described with reference to FIG. 27, when there is a low level interference to receive the response frame, the transmit device may recommend the data frame transmission channel as a response frame transmission channel. As described with reference to FIG. 28, if the response frame loss due to the interference is expected in all the sub-channels, the transmit device may recommend the adjacent channels as the response frame transmission channels.

The transmit device transmits a frame including the corresponding recommendation channel to each of the plurality of receive WLAN devices (S340). The recommendation channel for response frame transmission may be included in the sub-channel field of the interference aware information field. The interference aware information field further includes the mode field. The mode field may indicate an interference aware transmission mode (IAA or DCA).

The transmit device waits for the response frames transmitted from each of the receive devices in the recommendation channels of each of the plurality of receivers (S350).

Referring to FIG. 33, the transmit device detects the interference condition of the sub-channels (S410).

The transmit device selects the frame transmission channels for each of the plurality of receive devices based on the interference condition (S420).

The transmit device determines whether there is at least one receive WLAN device in which the response frame transmission channel needs to be changed based on the interference condition of the sub-channels (S430). When the response frame transmission channels for all the transmission channels need not be changed, the transmit device may set the DCA mode in the interference aware information fields of each transmit frame.

When the response frame transmission channel needs to be changed, the transmit device determines whether the delayed transmission of response frame is required based on the number of idle sub-channels and the number of receive devices (S440).

If it is determined that the number of idle sub-channels is equal to or more than the number of receivers, the transmit device determines the recommended transmission channels for each of the plurality of receive devices (S450). As described with reference to FIG. 26, the transmit device may recommend the idle sub-channel which may avoid the interference to the receive device, if the response frame loss is expected due to the interference. The transmit device transmits the frames including each recommended transmission channel.

If it is determined that the number of idle sub-channels is less than the number of receivers, the transmit device transmits the frame indicating the delayed transmission to at least one receive device (S460). As described with reference to FIG. 29, the transmit device time-divides the idle sub-channel to support the response frame transmission of multiple users. An indicator of response frame transmission delay is included in the delay field of the interference aware information field. The interference aware information field may further include the sub-channel field indicating the idle sub-channel and the mode field indicating the interference aware transmission mode. In this case, upon indicating the response delay for which transmit frame, the transmit device sets the duration field of the corresponding frame in consideration of the transmission time of the delayed response frame.

Figure 34:
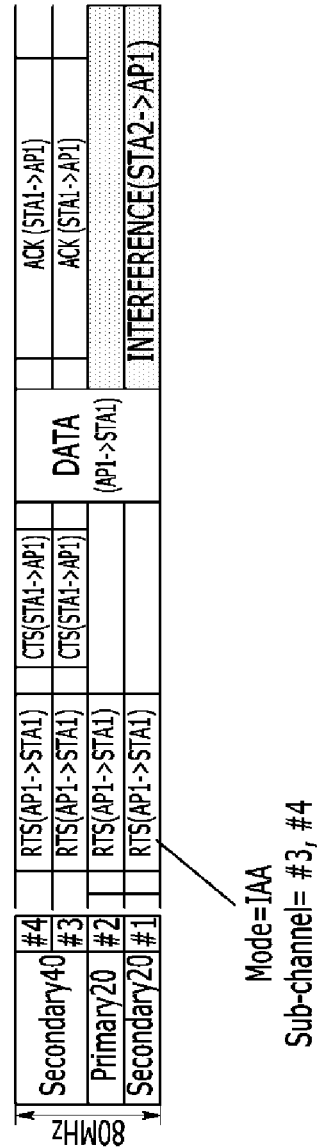
FIGS. 34 and 35 schematically show RTS/CTS frame transmissions of a method for interference aware communications according to an embodiment.
Figure 35:
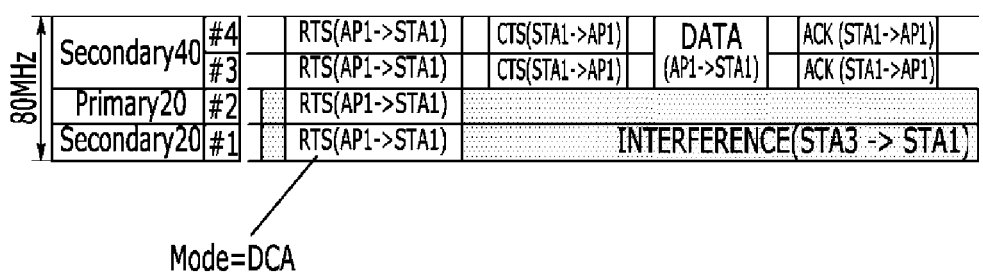

FIGS. 34 and 35 schematically show RTS/CTS frame transmissions of a method for interference aware communications according to an embodiment.

FIG. 34 shows the method of RTS/CTS frame transmission using the interference aware transmission (IAT) under the first unsymmetrical interference condition of the wireless communication network described with FIG. 6.

The STA2 related to the AP2 gives the interference to the AP1 in the subs-channels #1 and #2.

The AP1 transmits an RTS frame and transmits data to the STA1. Using the dynamic CCA, the AP1 may transmit the RTS frame even in the sub-channels with interference as well as the idle sub-channels. In this case, the AP1 transmits the RTS frame including the interference aware transmission (IAT). For example, the RTS frame includes the interference aware information (mode=IAA, sub-channel=#3, #4).

The STA1 may transmit a clear to send (CTS) frame in the sub-channel indicated in the RTS frame. That is, the STA1 transmits the CTS frame in the sub-channels #3 and #4.

The AP1 may receive the CTS frame in the sub-channels #3 and #4 and then transmit the data frame to all the sub-channels. Similarly, the data frame may include the interference aware information (mode=IAA, sub-channel=#3, #4).

The STA1 receives the data frame and transmits the ACK frame to the sub-channels #3 and #4.

FIG. 35 shows the method of RTS/CTS frame transmission using the interference aware transmission (IAT) under the second unsymmetrical interference condition of the wireless communication network described with FIG. 8.

The STA3 gives the interference to the STA1 in the subs-channels #1 and #2.

The AP1 transmits an RTS frame and transmit data to the STA1 in full channels. In this case, the AP1 transmits the RTS frame including the interference aware transmission (IAT). For example, the RTS frame includes the dynamic channel access (DCA). For example, the RTS frame may set the interference aware information in the mode field/sub-channel field.

The STA1 may know that the AP1 supports the dynamic channel access based on the interference aware information included in the RTS frame.

The STA1 dynamically allocates the sub-channel based on its own interference condition to transmit the CTS frame. That is, the STA1 transmits the CTS frame to the indicated sub-channels #3 and #4.

The AP1 receives the CTS frame in the sub-channels #3 and #4 and transmits the data frame to the sub-channel receiving the CTS frame.

The STA1 receives the data frame and transmits the ACK frame to the sub-channels #3 and #4.

As such, the devices supporting the interference aware transmission (IAT) technology may dynamically allocate the channel to adjust its own interference condition to transmit the RTS/CTS frame. In particular, when the dynamic channel access (DCA) method is applied to the RTS/CTS frame, the DCA may operate as a dynamic bandwidth allocation mechanism.

The method for interference aware communications described with reference to FIG. 1 to FIG. 35 is performed by an apparatus for interference aware communications. The apparatus for interference aware communications includes a memory storing instructions for performing the method for interference aware communications described with reference to FIGS. 1 to 35 or loading the instructions from a storage and temporarily storing the loaded instructions, a processor executing the instructions stored in the memory or the loaded instructions to process the method for interference aware communications according to the exemplary embodiment, and a transceiver transmitting a frame generated by the processor or receiving the frame transmitted through the wireless communication network. The apparatus for interference aware communications may be included in the WLAN device 1 of FIG. 1.

While the present disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scope of the appended claims.

What is claimed is:

1. A method for interference aware communications by a transmit device in a wireless local area network, the method comprising:
    selecting, by the transmit device, a transmission channel among a plurality of sub-channels for transmission of a frame;
    generating, by the transmit device, interference aware information based on an interference condition of the plurality of sub-channels;
    inserting, by the transmit device, the interference aware information into a medium access control (MAC) header of the frame, wherein the interference aware information is included in an interference aware information field of the frame, and the interference aware information field includes:
   a first field that indicates at least one sub-channel, wherein the first field comprises a sub-channel field value based on an integer value indicating the at least one sub-channel,
   a second field that indicates an interference aware mode, wherein the interference aware mode comprises (a) an interference aware acknowledgment (IAA) mode, the IAA mode set by the transmit device affected by interference, or (b) a dynamic channel access (DCA) mode that indicates support of a dynamic channel access, and
   a third field that indicates a response frame transmission delay, wherein the response frame transmission delay comprises (a) a first value that indicates immediate transmission of an acknowledgement (ACK) frame, (b) a second value that indicates a delay transmission of one ACK frame, or (c) a third value that indicates a delay transmission of a particular number of ACK frames; and
transmitting, by the transmit device, the frame in the selected transmission channel to a receive device, wherein the selected transmission channel includes interference associated with the interference condition, and wherein the interference aware information field of the frame facilitates the receive device to transmit a particular ACK frame by referring to the first field that indicates the at least one sub-channel and the third field that indicates the response frame transmission delay, or facilitates the receive device to request dynamic channel access to the transmit device based at least in part on the second field that indicates the DCA mode.

2. The method of claim 1, wherein the interference aware information includes at least one of the plurality of sub-channels for transmission of a response frame based on the frame.

3. The method of claim 2, further comprising:
receiving the response frame in response to the frame in the at least one of the plurality of sub-channels included in the interference aware information.

4. The method of claim 1, wherein the generating of the interference aware information includes:
   selecting at least one sub-channel of the plurality of sub-channels for transmission of a response frame, based on the interference condition of the plurality of sub-channels; and
   generating the interference aware information including the selected at least one sub-channel.

5. The method of claim 4, wherein the selecting of the at least one of the plurality of sub-channels includes:
   selecting at least one of the plurality of sub-channels that is different from the selected transmission channel for transmission of a response frame when an interference level of the selected transmission channel is higher than a reference.

6. The method of claim 1, wherein the generating of the interference aware information includes:
   generating the interference aware information including an indication that the transmit device supports dynamic clear channel assessment when an interference level of the selected transmission channel is higher than a reference.

7. The method of claim 6, wherein the interference aware information further includes at least one of the plurality of sub-channels with interference below the reference among the plurality of sub-channels.

8. A device for a wireless local area network, comprising:
a processor configured to:
   select a transmission channel among a plurality of sub-channels for transmission of a frame;
   generate interference aware information based on an interference condition of the plurality of sub-channels;
   insert the interference aware information into a medium access control (MAC) header of the frame, wherein the interference aware information is included in an interference aware information field of the frame, and the interference aware information field includes:
      a first field that indicates at least one sub-channel, wherein the first field comprises a sub-channel field value based on an integer value indicating the at least one sub-channel,
      a second field that indicates an interference aware mode, wherein the interference aware mode comprises (a) an interference aware acknowledgment (IAA) mode, the IAA mode set by the device affected by interference, or (b) a dynamic channel access (DCA) mode that indicates support of a dynamic channel access, and
      a third field that indicates a response frame transmission delay, wherein the response frame transmission delay comprises (a) a first value that indicates immediate transmission of an acknowledgement (ACK) frame, (b) a second value that indicates a delay transmission of one ACK frame, or (c) a third value that indicates a delay transmission of a particular number of ACK frames; and
   transmit the frame in the selected transmission channel to a receive device,
wherein the selected transmission channel includes interference associated with the interference condition, and wherein the interference aware information field of the frame facilitates the receive device to transmit a particular ACK frame by referring to the first field that indicates the at least one sub-channel and the third field that indicates the response frame transmission delay, or facilitates the receive device to request dynamic channel access to the device based at least in part on the second field that indicates the DCA mode.

9. The device of claim 8, wherein the interference aware information includes at least one of the plurality of sub-channels for transmission of a response frame based on the frame.

10. The device of claim 9, wherein the processor is further configured to:
receive the response frame in response to the frame in the at least one of the plurality of sub-channels included in the interference aware information.

11. The device of claim 8, wherein the processor is further configured to:
   select at least one sub-channel of the plurality of sub-channels for transmission of a response frame, based on the interference condition of the plurality of sub-channels; and
   generate the interference aware information including the selected at least one sub-channel.

12. The device of claim 11, wherein the processor is further configured to:
   select at least one of the plurality of sub-channels that is different from the selected transmission channel for transmission of a response frame when an interference level of the selected transmission channel is higher than a reference.

13. The device of claim 8, wherein the processor is further configured to:
   generate the interference aware information including an indication that the device supports dynamic clear channel assessment when an interference level of the selected transmission channel is higher than a reference.

14. The device of claim 13, wherein the interference aware information further includes at least one of the plurality of sub-channels with interference below the reference among the plurality of sub-channels.

15. A non-transitory computer-readable medium comprising instructions, which when executed by a computing device, cause the computing device to perform operations comprising:
   selecting a transmission channel among a plurality of sub-channels for transmission of a frame;
   generating interference aware information based on an interference condition of the plurality of sub-channels;
   inserting the interference aware information into a medium access control (MAC) header of the frame, wherein the interference aware information is included in an interference aware information field of the frame, and the interference aware information field includes:
      a first field that indicates at least one sub-channel, wherein the first field comprises a sub-channel field value based on an integer value indicating the at least one sub-channel,
      a second field that indicates an interference aware mode, wherein the interference aware mode comprises (a) an interference aware acknowledgment (IAA) mode, the IAA mode set by the computing device affected by interference, or (b) a dynamic channel access (DCA) mode that indicates support of a dynamic channel access, and
      a third field that indicates a response frame transmission delay, wherein the response frame transmission delay comprises (a) a first value that indicates immediate transmission of an acknowledgement (ACK) frame, (b) a second value that indicates a delay transmission of one ACK frame, or (c) a third value that indicates a delay transmission of a particular number of ACK frames; and
   transmitting the frame in the selected transmission channel to a receive device, wherein the selected transmission channel includes interference associated with the interference condition, and wherein the interference aware information field of the frame facilitates the receive device to transmit a particular ACK frame by referring to the first field that indicates the at least one sub-channel and the third field that indicates the response frame transmission delay, or facilitates the receive device to request dynamic channel access to the computing device based at least in part on the second field that indicates the DCA mode.

16. The non-transitory computer-readable medium of claim 15, wherein the interference aware information includes at least one of the plurality of sub-channels for transmission of a response frame based on the frame.

17. The non-transitory computer-readable medium of claim 16, comprising further instructions, which when executed by the computing device, cause the computing device to perform further operations comprising:
   receiving the response frame in response to the frame in the at least one of the plurality of sub-channels included in the interference aware information.

18. The non-transitory computer-readable medium of claim 16, wherein the generating of the interference aware information includes:
   selecting at least one sub-channel of the plurality of sub-channels for transmission of a response frame, based on the interference condition of the plurality of sub-channels; and
   generating the interference aware information including the selected at least one sub-channel.

19. The non-transitory computer-readable medium of claim 18, wherein the selecting of the at least one of the plurality of sub-channels includes:
   selecting at least one of the plurality of sub-channels that is different from the selected transmission channel for transmission of a response frame when an interference level of the selected transmission channel is higher than a reference.

20. The non-transitory computer-readable medium of claim 18, wherein the generating of the interference aware information includes:
   generating the interference aware information including an indication that the computing device supports dynamic clear channel assessment when an interference level of the selected transmission channel is higher than a reference, wherein the interference aware information further includes at least one of the plurality of sub-channels with interference below the reference among the plurality of sub-channels.

* * * * *